United States Patent

Shimpuku et al.

[11] Patent Number: 5,357,524
[45] Date of Patent: Oct. 18, 1994

[54] APPARATUS FOR CONVERTING A DIGITAL SIGNAL

[75] Inventors: Yoshihide Shimpuku, Kanagawa; Hiroyuki Ino, Tokyo; Yasuyuki Chaki, Chiba, all of Japan

[73] Assignee: Sony Corporation, Tokyo, Japan

[21] Appl. No.: 21,237

[22] Filed: Feb. 23, 1993

[30] Foreign Application Priority Data

Feb. 24, 1992 [JP] Japan ................... 4-036696

[51] Int. Cl.$^5$ ................... G06F 11/00
[52] U.S. Cl. ................... 371/30; 371/55; 371/43; 341/94; 341/59; 341/107
[58] Field of Search ............ 371/30, 55, 43; 341/94, 341/59, 107

[56] References Cited

U.S. PATENT DOCUMENTS

| | | | |
|---|---|---|---|
| 4,716,385 | 12/1987 | Noda et al. | 371/30 |
| 4,928,187 | 5/1990 | Rees | 360/40 |
| 5,016,258 | 5/1991 | Tanaka et al. | 371/55 |

FOREIGN PATENT DOCUMENTS

| | | | |
|---|---|---|---|
| 0205667 | 12/1986 | European Pat. Off. | H03M 13/00 |
| 0242121 | 10/1987 | European Pat. Off. | G11B 20/10 |
| 1-151077 | 6/1989 | Japan | G11B 20/10 |
| 2131022 | 5/1990 | Japan | H03M 7/14 |
| 3293819 | 12/1991 | Japan | H03M 5/06 |

OTHER PUBLICATIONS

IEEE Communication Magazine vol. 23, No. 2, Feb. 1985, Piscataway, N.J., US pp. 7–15 J. B. H. Peek 'Communications Aspects of the Compact Disc Digital Audio System' *p. 8, right col., line 1–p. 8, right col., line 47*.

Patent Abstracts of Japan, vol. 13, No. 412 (P–932) (3760) Sep. 12, 1989.

Elektor Electronics vol. 14, No. 157, Jun. 1988, Canterbury GB pp. 14–18 Anon. 'Philips–Sony digital Audio Interface' *p. 14, col. 3, line 5–p. 16, col. 2, line 19; FIGS. 1,2*.

Patent Abstracts of Japan vol. 14, No. 365 (E–0961) Aug. 8, 1990.

Patent Abstracts of Japan vol. 16, No. 130 (E–1184) Apr. 2, 1992.

Primary Examiner—Robert W. Beausoliel, Jr.
Assistant Examiner—Phung My Chung
Attorney, Agent, or Firm—Lewis H. Eslinger; Jay H. Maioli

[57] ABSTRACT

A maximum likelihood decoder (28) comprises a Viterbi decoding unit (30) and a symbol concluding unit (29). Final N-M bit data of data of N (>M) bit unit, to which M-bit original data is converted, is supplied to the symbol concluding unit (29) as a terminal portion and other data is supplied to the Viterbi decoding unit (30), thereby being demodulated by a demodulator (37). A maximum likelihood decoding apparatus is provided in which image data or the like can be recorded and reproduced at high speed and maximum likelihood parallel decoding is effected. A reproducing data demodulating apparatus using such maximum likelihood decoding apparatus is also provided.

7 Claims, 21 Drawing Sheets

| | 47 | 49 | 51 | 53 | 55 | 57 | 59 | 61 | 63 | 65 | 67 | 69 | 71 | 73 | 75 | 77 | 79 | 81 | 83 | 85 | 87 | 89 |
|---|---|---|---|---|---|---|---|---|---|---|---|---|---|---|---|---|---|---|---|---|---|---|
| | 1 | 0 | 0 | 0 | 0 | 0 | 0 | 0 | 0 | 0 | 0 | 0 | 0 | 0 | 1 | 0 | 0 | 0 | 0 | 0 | 0 | 0 |
| | 0 | 0 | 1 | 1 | 1 | 0 | 0 | 0 | 0 | 0 | 0 | 0 | 0 | 0 | 0 | 1 | 1 | 1 | 1 | 0 | 0 | 0 |
| | 0 | 1 | 1 | 1 | 1 | 1 | 1 | 1 | 1 | 1 | 1 | 1 | 1 | 0 | 1 | 1 | 1 | 1 | 1 | 1 | 1 | 1 |
| | 0 | 1 | 0 | 1 | 0 | 1 | 1 | 0 | 1 | 0 | 1 | 1 | 0 | 0 | 1 | 0 | 0 | 1 | 0 | 1 | 1 | 0 |
| | 1 | 1 | 0 | 0 | 1 | 0 | 1 | 1 | 0 | 1 | 0 | 1 | 1 | 0 | 1 | 0 | 0 | 0 | 1 | 0 | 1 |
| | 1 | 1 | 1 | 0 | 0 | 1 | 0 | 1 | 1 | 1 | 0 | 0 | 1 | 0 | 1 | 0 | 1 | 0 | 0 | 0 | 0 | 1 |
| | 1 | 0 | 1 | 1 | 1 | 1 | 1 | 0 | 1 | 0 | 1 | 0 | 1 | 0 | 0 | 0 | 0 | 1 | 0 | 1 | 0 |
| | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| | 1 | 1 | 0 | 0 | 0 | 0 | 0 | 0 | 0 | 1 | 1 | 1 | 1 | 1 | 1 | 1 | 1 | 1 | 1 | 1 | 1 | 1 |
| | 0 | 0 | 1 | 1 | 1 | 1 | 1 | 1 | 1 | 0 | 0 | 0 | 0 | 0 | 0 | 0 | 0 | 0 | 0 | 1 | 1 | 1 |
| | 1 | 1 | 0 | 0 | 0 | 0 | 0 | 0 | 0 | 1 | 1 | 1 | 1 | 1 | 1 | 1 | 1 | 1 | 1 | 0 | 0 | 0 |

| | 47 | 49 | 51 | 53 | 55 | 57 | 59 | 61 | 63 | 65 | 67 | 69 | 71 | 73 | 75 | 77 | 79 | 81 | 83 | 85 | 87 | 89 |
|---|---|---|---|---|---|---|---|---|---|---|---|---|---|---|---|---|---|---|---|---|---|---|
| | +1 | +1 | +1 | +1 | +1 | +1 | +1 | +1 | +1 | +1 | +1 | +1 | +1 | +1 | +1 | +1 | +1 | +1 | +1 | +1 | +1 | +1 |

| | 46 | 48 | 50 | 52 | 54 | 56 | 58 | 60 | 62 | 64 | 66 | 68 | 70 | 72 | 74 | 76 | 78 | 80 | 82 | 84 | 86 | 88 |
|---|---|---|---|---|---|---|---|---|---|---|---|---|---|---|---|---|---|---|---|---|---|---|
| | 1 | 0 | 1 | 1 | 1 | 1 | 1 | 1 | 1 | 1 | 1 | 1 | 1 | 0 | 1 | 1 | 1 | 1 | 1 | 1 | 1 | 1 |
| | 0 | 0 | 0 | 1 | 1 | 1 | 0 | 0 | 0 | 0 | 0 | 0 | 0 | 0 | 0 | 0 | 1 | 1 | 1 | 1 | 0 | 0 |
| | 0 | 1 | 0 | 0 | 0 | 0 | 0 | 0 | 0 | 0 | 0 | 0 | 0 | 0 | 1 | 0 | 0 | 0 | 0 | 0 | 0 | 0 |
| | 1 | 0 | 1 | 0 | 1 | 0 | 1 | 1 | 0 | 1 | 0 | 1 | 1 | 0 | 0 | 1 | 0 | 0 | 1 | 0 | 1 | 1 |
| | 0 | 1 | 1 | 0 | 0 | 1 | 0 | 1 | 1 | 0 | 1 | 0 | 1 | 1 | 0 | 1 | 0 | 0 | 0 | 1 | 0 |
| | 1 | 1 | 1 | 1 | 0 | 0 | 1 | 0 | 1 | 1 | 1 | 0 | 0 | 1 | 0 | 1 | 0 | 1 | 0 | 0 | 0 | 0 |
| | 1 | 1 | 0 | 1 | 1 | 1 | 1 | 1 | 0 | 1 | 0 | 1 | 0 | 1 | 0 | 0 | 0 | 0 | 1 | 0 | 1 |
| | 0 | 0 | 0 | 1 | 1 | 1 | 1 | 1 | 1 | 1 | 1 | 1 | 1 | 1 | 1 | 1 | 1 | 1 | 1 | 1 | 1 | 1 |
| | 1 | 1 | 1 | 0 | 0 | 0 | 0 | 0 | 0 | 0 | 1 | 1 | 1 | 1 | 1 | 1 | 1 | 1 | 1 | 1 | 1 | 1 |
| | 0 | 0 | 0 | 1 | 1 | 1 | 1 | 1 | 1 | 1 | 0 | 0 | 0 | 0 | 0 | 0 | 0 | 0 | 0 | 0 | 1 | 1 |
| | 1 | 1 | 1 | 0 | 0 | 0 | 0 | 0 | 0 | 0 | 0 | 1 | 1 | 1 | 1 | 1 | 1 | 1 | 1 | 1 | 0 | 0 |

| M Original Data | | N Converted Data | | | | | | | | | |
|---|---|---|---|---|---|---|---|---|---|---|---|
| | DSV | | | | | | | | | | |
| 132 | +1 | 1 | 0 | 1 | 0 | 0 | 1 | 0 | 0 | 1 | 1 |
| 134 | +1 | 1 | 0 | 0 | 1 | 1 | 1 | 0 | 0 | 0 | 1 |
| 136 | +1 | 1 | 0 | 1 | 1 | 1 | 1 | 0 | 0 | 0 | 1 |
| 138 | +1 | 1 | 0 | 1 | 0 | 1 | 1 | 0 | 0 | 0 | 1 |
| 140 | +1 | 1 | 0 | 1 | 1 | 0 | 1 | 0 | 1 | 1 | 1 |
| 142 | +1 | 1 | 1 | 1 | 0 | 1 | 1 | 1 | 1 | 1 | 1 |
| 144 | +1 | 1 | 1 | 1 | 1 | 1 | 1 | 1 | 1 | 1 | 1 |
| 146 | +1 | 1 | 1 | 0 | 1 | 1 | 1 | 1 | 1 | 1 | 1 |
| 148 | +1 | 1 | 1 | 1 | 0 | 1 | 1 | 1 | 1 | 1 | 1 |
| 150 | +1 | 1 | 1 | 1 | 1 | 0 | 1 | 1 | 1 | 1 | 1 |
| 152 | +1 | 1 | 1 | 0 | 1 | 1 | 1 | 1 | 1 | 0 | 1 |
| 154 | +1 | 1 | 1 | 1 | 0 | 1 | 1 | 1 | 1 | 0 | 1 |
| 156 | +1 | 1 | 1 | 1 | 1 | 0 | 1 | 1 | 1 | 0 | 1 |
| 158 | +1 | 1 | 1 | 1 | 1 | 1 | 1 | 1 | 0 | 0 | 1 |
| 160 | +1 | 1 | 1 | 1 | 1 | 1 | 0 | 1 | 0 | 0 | 1 |
| 162 | +1 | 1 | 1 | 1 | 0 | 1 | 0 | 1 | 0 | 0 | 1 |
| 164 | +1 | 1 | 1 | 1 | 1 | 0 | 0 | 1 | 0 | 0 | 1 |
| 166 | +1 | 1 | 1 | 0 | 0 | 0 | 0 | 1 | 0 | 0 | 1 |
| 168 | +1 | 1 | 0 | 1 | 1 | 0 | 0 | 1 | 0 | 0 | 1 |
| 170 | +1 | 0 | 1 | 0 | 0 | 1 | 0 | 1 | 1 | 1 | 1 |
| 172 | +1 | 0 | 1 | 0 | 0 | 0 | 0 | 0 | 1 | 1 | 1 |

| M Original Data | | N Converted Data | | | | | | | | | |
|---|---|---|---|---|---|---|---|---|---|---|---|
| | DSV | | | | | | | | | | |
| 133 | +1 | 1 | 1 | 1 | 0 | 0 | 0 | 0 | 1 | 0 | 0 |
| 135 | +1 | 1 | 1 | 0 | 1 | 1 | 0 | 0 | 0 | 0 | 0 |
| 137 | +1 | 1 | 1 | 1 | 1 | 1 | 0 | 0 | 0 | 0 | 0 |
| 139 | +1 | 0 | 1 | 1 | 0 | 1 | 0 | 0 | 1 | 0 | 0 |
| 141 | +1 | 0 | 0 | 1 | 1 | 0 | 1 | 1 | 1 | 0 | 0 |
| 143 | +1 | 0 | 0 | 1 | 1 | 1 | 1 | 1 | 1 | 0 | 0 |
| 145 | +1 | 0 | 0 | 0 | 1 | 0 | 1 | 1 | 1 | 1 | 0 |
| 147 | +1 | 0 | 0 | 1 | 0 | 1 | 1 | 1 | 1 | 1 | 0 |
| 149 | +1 | 0 | 0 | 1 | 1 | 0 | 1 | 1 | 1 | 1 | 0 |
| 151 | +1 | 0 | 0 | 1 | 0 | 1 | 0 | 1 | 1 | 1 | 0 |
| 153 | +1 | 0 | 0 | 1 | 1 | 0 | 0 | 1 | 1 | 1 | 0 |
| 155 | +1 | 1 | 0 | 1 | 0 | 1 | 0 | 1 | 1 | 1 | 0 |
| 157 | +1 | 1 | 0 | 1 | 1 | 0 | 0 | 1 | 1 | 1 | 0 |
| 159 | +1 | 1 | 0 | 1 | 1 | 1 | 0 | 0 | 1 | 0 | 0 |
| 161 | +1 | 1 | 0 | 1 | 0 | 1 | 1 | 0 | 1 | 0 | 0 |
| 163 | +1 | 1 | 0 | 1 | 1 | 0 | 1 | 0 | 1 | 0 | 0 |
| 165 | +1 | 1 | 0 | 0 | 1 | 0 | 1 | 0 | 1 | 0 | 0 |
| 167 | +1 | 1 | 1 | 0 | 0 | 1 | 0 | 1 | 0 | 1 | 0 |
| 169 | +1 | 1 | 0 | 1 | 1 | 1 | 1 | 0 | 0 | 0 | 1 |
| 171 | +1 | 0 | 0 | 0 | 0 | 0 | 0 | 0 | 0 | 1 | 1 |
| 173 | +1 | 0 | 0 | 0 | 0 | 0 | 0 | 0 | 0 | 1 | 1 |

| | | | | | | | | | | | | N | +3 |
|---|---|---|---|---|---|---|---|---|---|---|---|---|---|
| 1 | 0 | 0 | 1 | 1 | 1 | 0 | 1 | 1 | 0 | 1 | 1 | 216 | +3 |
| 1 | 0 | 1 | 1 | 1 | 1 | 0 | 1 | 1 | 1 | 1 | 0 | 218 | +3 |
| 1 | 1 | 1 | 0 | 0 | 0 | 1 | 1 | 1 | 1 | 0 | 0 | 220 | +3 |
| 1 | 1 | 1 | 1 | 0 | 0 | 0 | 1 | 1 | 0 | 1 | 0 | 222 | +3 |
| 1 | 0 | 1 | 0 | 1 | 0 | 0 | 1 | 1 | 0 | 1 | 0 | 224 | +3 |
| 1 | 0 | 1 | 0 | 1 | 0 | 1 | 1 | 1 | 0 | 1 | 0 | 226 | +3 |
| 1 | 1 | 0 | 1 | 0 | 1 | 1 | 0 | 0 | 0 | 0 | 0 | 228 | +3 |
| 0 | 0 | 1 | 1 | 1 | 1 | 0 | 1 | 1 | 1 | 0 | 1 | 230 | +3 |
| 1 | 1 | 0 | 0 | 1 | 1 | 0 | 1 | 1 | 0 | 1 | 0 | 232 | +3 |
| 1 | 1 | 0 | 1 | 1 | 1 | 0 | 1 | 1 | 0 | 1 | 0 | 234 | +3 |
| 1 | 1 | 1 | 1 | 1 | 1 | 0 | 1 | 1 | 0 | 1 | 0 | 236 | +3 |
| 1 | 0 | 0 | 1 | 1 | 1 | 0 | 1 | 1 | 0 | 1 | 0 | 238 | +3 |
| 1 | 1 | 0 | 0 | 1 | 1 | 0 | 0 | 0 | 1 | 0 | 0 | 240 | +3 |
| 1 | 1 | 1 | 1 | 1 | 0 | 0 | 1 | 1 | 0 | 1 | 0 | 242 | +3 |
| 1 | 0 | 1 | 0 | 1 | 0 | 0 | 1 | 1 | 0 | 1 | 0 | 244 | +3 |
| 1 | 1 | 1 | 1 | 1 | 1 | 0 | 0 | 0 | 0 | 1 | 0 | 246 | +3 |
| 1 | 1 | 1 | 0 | 1 | 0 | 0 | 1 | 1 | 0 | 0 | 0 | 248 | +3 |
| 1 | 1 | 1 | 0 | 1 | 1 | 0 | 0 | 0 | 1 | 0 | 0 | 250 | +3 |
| 1 | 0 | 0 | 1 | 1 | 0 | 0 | 1 | 1 | 0 | 0 | 0 | 252 | +3 |
| 1 | 1 | 1 | 0 | 1 | 1 | 0 | 1 | 1 | 0 | 0 | 1 | 254 | +3 |

| | | | | | | | | | | | | N | +3 |
|---|---|---|---|---|---|---|---|---|---|---|---|---|---|
| 1 | 0 | 1 | 1 | 1 | 0 | 0 | 1 | 0 | 1 | 0 | 0 | 217 | +3 |
| 0 | 1 | 1 | 0 | 1 | 1 | 0 | 1 | 1 | 1 | 1 | 0 | 219 | +3 |
| 0 | 1 | 1 | 0 | 0 | 0 | 1 | 1 | 1 | 1 | 1 | 0 | 221 | +3 |
| 0 | 1 | 1 | 1 | 0 | 1 | 0 | 1 | 0 | 1 | 1 | 0 | 223 | +3 |
| 0 | 1 | 1 | 0 | 1 | 0 | 0 | 1 | 1 | 1 | 1 | 0 | 225 | +3 |
| 0 | 1 | 1 | 0 | 1 | 1 | 1 | 0 | 1 | 1 | 1 | 0 | 227 | +3 |
| 0 | 1 | 1 | 1 | 0 | 0 | 1 | 1 | 0 | 1 | 1 | 0 | 229 | +3 |
| 1 | 0 | 0 | 1 | 1 | 1 | 0 | 0 | 0 | 1 | 1 | 0 | 231 | +3 |
| 1 | 0 | 0 | 1 | 1 | 1 | 0 | 1 | 0 | 0 | 1 | 0 | 233 | +3 |
| 0 | 1 | 1 | 0 | 1 | 1 | 1 | 1 | 1 | 0 | 1 | 0 | 235 | +3 |
| 1 | 1 | 1 | 0 | 1 | 1 | 1 | 1 | 1 | 1 | 1 | 0 | 237 | +3 |
| 1 | 1 | 1 | 0 | 1 | 1 | 1 | 0 | 1 | 1 | 1 | 0 | 239 | +3 |
| 1 | 1 | 1 | 1 | 0 | 1 | 1 | 0 | 1 | 1 | 1 | 0 | 241 | +3 |
| 1 | 1 | 1 | 0 | 0 | 0 | 1 | 1 | 0 | 0 | 1 | 0 | 243 | +3 |
| 1 | 1 | 1 | 1 | 0 | 1 | 0 | 1 | 1 | 0 | 1 | 0 | 245 | +3 |
| 1 | 1 | 1 | 1 | 1 | 0 | 0 | 0 | 0 | 1 | 1 | 0 | 247 | +3 |
| 1 | 1 | 1 | 1 | 0 | 0 | 1 | 0 | 0 | 1 | 0 | 0 | 249 | +3 |
| 1 | 1 | 1 | 1 | 1 | 1 | 0 | 1 | 1 | 0 | 0 | 0 | 251 | +3 |
| 1 | 1 | 1 | 1 | 0 | 0 | 1 | 0 | 0 | 0 | 0 | 0 | 253 | +3 |
| 1 | 0 | 0 | 1 | 1 | 0 | 0 | 1 | 1 | 0 | 0 | 1 | 255 | +3 |

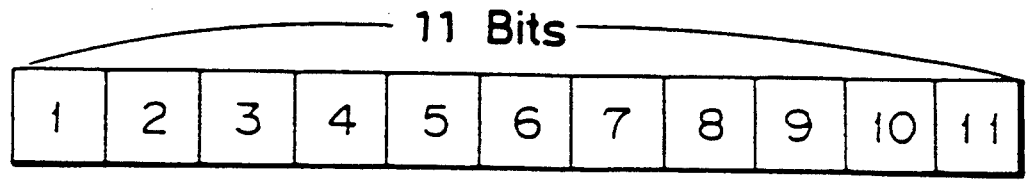
FIG. 11A
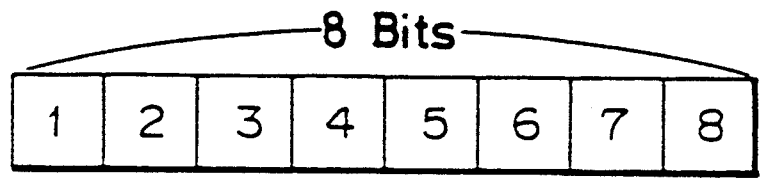
FIG. 11B
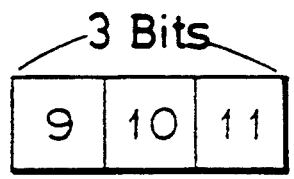
FIG. 11C
FIG. 12
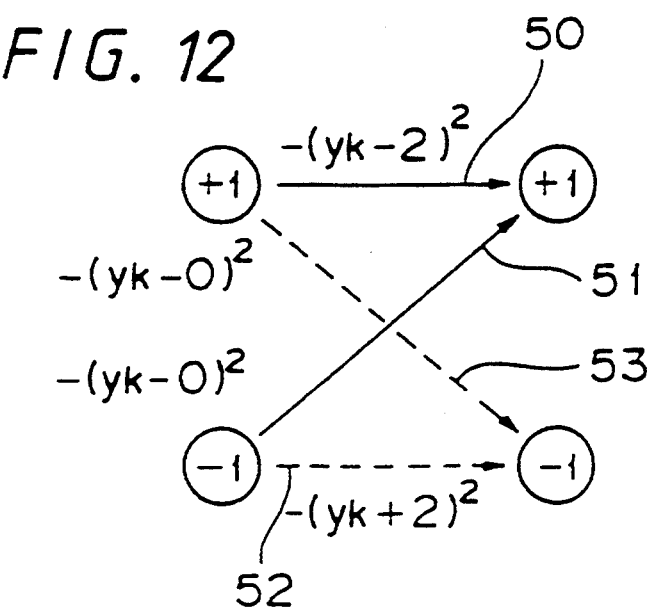

APPARATUS FOR CONVERTING A DIGITAL SIGNAL

BACKGROUND OF THE INVENTION

1. Field of the Invention

The present invention generally relates to recording data modulating apparatus and reproducing data demodulating apparatus for use in recording and/or reproducing digital data. More particularly, this invention relates to recording data modulating apparatus and reproducing data demodulating apparatus in which a modulation code is a variable length code for converting recording data of m-bit unit into a recording code of n-bit unit and to a reproducing data demodulating apparatus in which a variable length code and a maximum likelihood decoding such as a Viterbi algorithm are combined.

2. Description of the Prior Art

Recently, in recording and reproducing appliances such as a digital VTR (video tape recorder) or the like, advance in high density has been made and as one of its elemental techniques, a variety of modulation and demodulation systems are examined. Particularly, there is known a partial response (Partial Response) system or the like which positively utilizes an intersymbolic interference from the beginning in order to restrict the intersymbolic interference and performs a code configuration.

Particularly, Kretzmer (E. R. Kretzmer), a proposer of this system, mentioned five kinds of characteristics as typical ones of a transmission system upon a dual information series and referred to them as classes I, II, III, IV and V, respectively. Among these classes, FIG. 1 shows a frequency characteristic of the class I (hereinafter referred to as Pr (1, 1)) of a so-called duobinary code (Duobinary) used in the present embodiment. Such Pr (1, 1) enables the frequency characteristic to be compressed into ½ in comparison with a single-current system encoding. In order to restrict a recording band in this way, and, further, to reduce deterioration of S/N ratio, a decoding system called a maximum likelihood decoding (Maximum Likelihood Sequence Estimation) is also employed.

A Viterbi decoding is known as the simplest system of the maximum likelihood decoding. The Viterbi decoding is a decoding method which permits the whole electric power of an input signal to be effectively used in the same way in a matched filter. A fundamental construction of such viterbi decoding and a construction of a viterbi decoding circuit or the like upon application thereof to the recording and reproducing system in the form of an NRZI code are described in detail by Yoshizumi Eto and two others, in "A digital video recording technique", Nikkan Industrial Newspapers Co., pp 72–84, Aug. 31, 1990.

There is known "data conversion and detecting method" which is disclosed in Japanese Laid-Open Patent Publication No. 4-76867 (laid-open on Mar. 11, 1992). According to this prior art, by increasing a pattern distance between code patterns in order to avoid an intersymbol interference, it is possible to increase a recording density while a present recording medium and recording and reproducing device are utilized. According to the arrangement of this prior art, in a data converting circuit in the recording system, of N codes of conversion data, n consecutive codes the number of which is equal to the number of intersymbol interferences that can be allowed in view of the characteristic of transmission path are weighted so as to linearly decrease from a reference value of a distribution center. When n consecutive codes thus weighted are sequentially added to form intermediate series of N-n+1 bits, conversion data is selected as a code so that a total of absolute values of a difference between codes of the intermediate series becomes more than a predetermined number of times the value of a reference value of the weighting. Thus, the pattern distance between the code patterns is increased.

Further, there is known "data conversion and detection method" which is disclosed in Japanese Laid-Open Patent Publication No. 4-89664 (laid-open on Mar. 23, 1992). In this prior art, as a code of at least a preceding portion of conversion data, there is selected one such that a total (modulation code distance) of absolute values of a difference between codes of intermediate series becomes more than a predetermined number of times the standard value of the weighting. Thus, an error rate in the playback can be reduced and a recording density can be improved. An arrangement of this prior art will be described below. N codes of conversion data are divided into Ns preceding portions and Nt succeeding portions. Of Ns preceding portions and Nt succeeding portions, n consecutive codes whose number is equal to the number of intersymbol interferences that can be allowed in the transmission path are weighted so as to decrease linearly from the center. When n consecutive codes thus weighted are sequentially added to form intermediate series, as at least the code of the preceding portion of conversion data, there is selected one such that a total of absolute values of difference between codes of intermediate series becomes more than a predetermined number of times the standard value of the weighting. Therefore, the pattern distance between the code patterns can be increased and the error rate in the playback mode can be reduced while the present media and recording and reproducing device are utilized. Also, the recording density can be improved.

Furthermore, there is known "Application of New Variable-length block code and Viterbi Decoding using d-constraint to magneto-optical-Recording", Vol. 44, No. 10, pp. 1369 to 1375, 1990, in The Journal of the Institute of Television Engineers of Japan. A summary of this paper will be described below. A (3, 19; 4, 9;3) code, one of the variable-length block codes, is developed. This code introduces less intersymbol interference into magneto-optical recording than a conventional (2, 7; 1,2;4) code. A PR(1, 1) system, used for signal detection, and Viterbi decoding using the d-constraint of these codes as a decoding method, are proposed. Their error probabilities are obtained by computer simulation. Their performance is compared with the conventional peak detection method. The results show the proposed method exhibits excellent performance compared with the conventional one, and a large improvement in performance is achieved by using a (3, 19; 4, 9; 3) code.

The above-mentioned digital video recording technique discloses (pp. 83 to 84) the technique that the Viterbi decoding is applied to the Pr(1, 1) transmission path (optical disc), whereby an error rate is improved and a signal-to-noise (S/N) ratio is improved by 2 dB.

Although the S/N ratio can be improved and an electric power can be utilized effectively by using both the maximum likelihood decoding and the partial response system, this maximum likelihood decoding is a sequential decoding. Thus, when a predetermined metric is detected, a point immediately preceding the detection point must be detected and therefore the parallel processing cannot be effected.

Further, when the calculation for detecting a metric is carried out, there is then the probability that there remain indefinite data. Therefore, the length to the end that data is determined cannot be determined as a predetermined length. Consequently, the hardware arrangement becomes complex and the circuit scale is increased.

Furthermore, there occurs an error propagation (see pp. 79 to 81 of the above digital video recording technique). There is then the possibility that this error occurs over 2 symbols. In such case, there are then the problems that an error correction code or the like will be destroyed.

OBJECTS AND SUMMARY OF THE INVENTION

Therefore, it is an object of the present invention to provide improved recording data modulating apparatus and reproducing data demodulating apparatus in which the aforesaid shortcomings and disadvantages of the prior art can be eliminated.

More specifically, it is an object of the present invention to provide a modulating and demodulating apparatus of high speed and large capacity.

It is another object of the present invention to provide a demodulating apparatus in which an error propagation of Viterbi decoding can be avoided and in which a high speed processing can be made by a parallel decoding.

According to a first aspect of the present invention, there is provided a recording data modulating apparatus in which M-bit original data is converted into N (>M)-bit recording code. This recording data modulating apparatus comprises a modulation table in which there is stored an M-N modulation code in which the number of consecutive 0's is less than 4 and a ratio between a maximum magnetic transition interval Tmax and a minimum magnetic transition interval Tmin is less than 4, a synchronizing pattern generating circuit for generating a synchronizing signal, and a multiplexing circuit for adding the synchronizing signal to a modulation code from the modulation table. For example, the M-N modulation code is an 8-11 modulation code and Tmax/T=2.9 and Tmin/T=0.73 when T assumes a reference clock of the original data.

According to a second aspect of the present invention, there is provided a reproducing data demodulating apparatus in which a synchronization of digital reproducing data is detected and the reproducing data is demodulated to obtain a decoding data. This reproducing data demodulating apparatus comprises a detecting circuit for assigning a final N-M bit in conversion data in which original data of M-bit unit is converted into data of N (>M)-bit unit as a terminal portion and detecting a code pattern that corresponds to reproducing data of reproduced waveform of the terminal portion, a determining circuit for determining a code pattern detected by the detecting means and outputting the code, a decoding circuit for decoding reproducing data by using the code output from the determining means, and a demodulating circuit for demodulating an N-bit code decoded by the decoding means into M-bit data. For example, the decoding circuit decodes reproducing data on the basis of Viterbi algorithm in a maximum likelihood fashion.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIGS. 6 and 7 are respectively tables used to explain operation of a modulator;

FIGS. 11A through 11C are respectively explanatory diagrams the conversion method of the maximum likelihood decoding apparatus according to the present invention;

FIG. 12 is a trellis line diagram used to explain a viterbi decoding of the maximum likelihood decoding apparatus according to the present invention;

DETAILED DESCRIPTION OF THE PREFERRED EMBODIMENT

Figure 1:
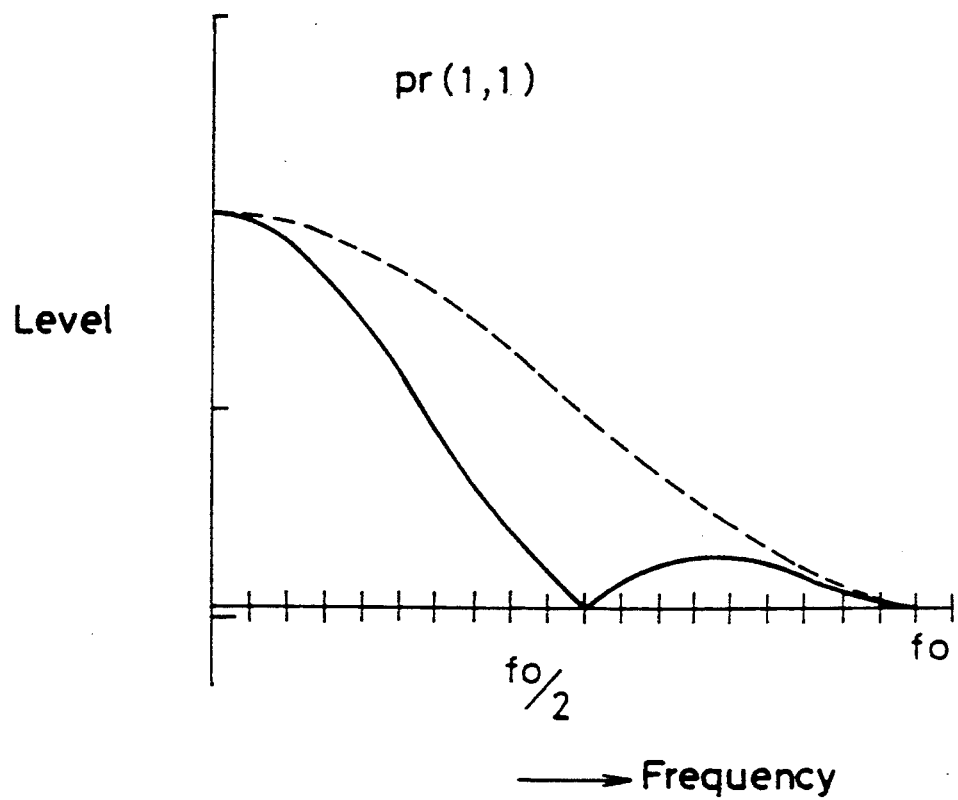
FIG. 1 is a diagram of frequency characteristic of a conventional partial response.
Figure 2:
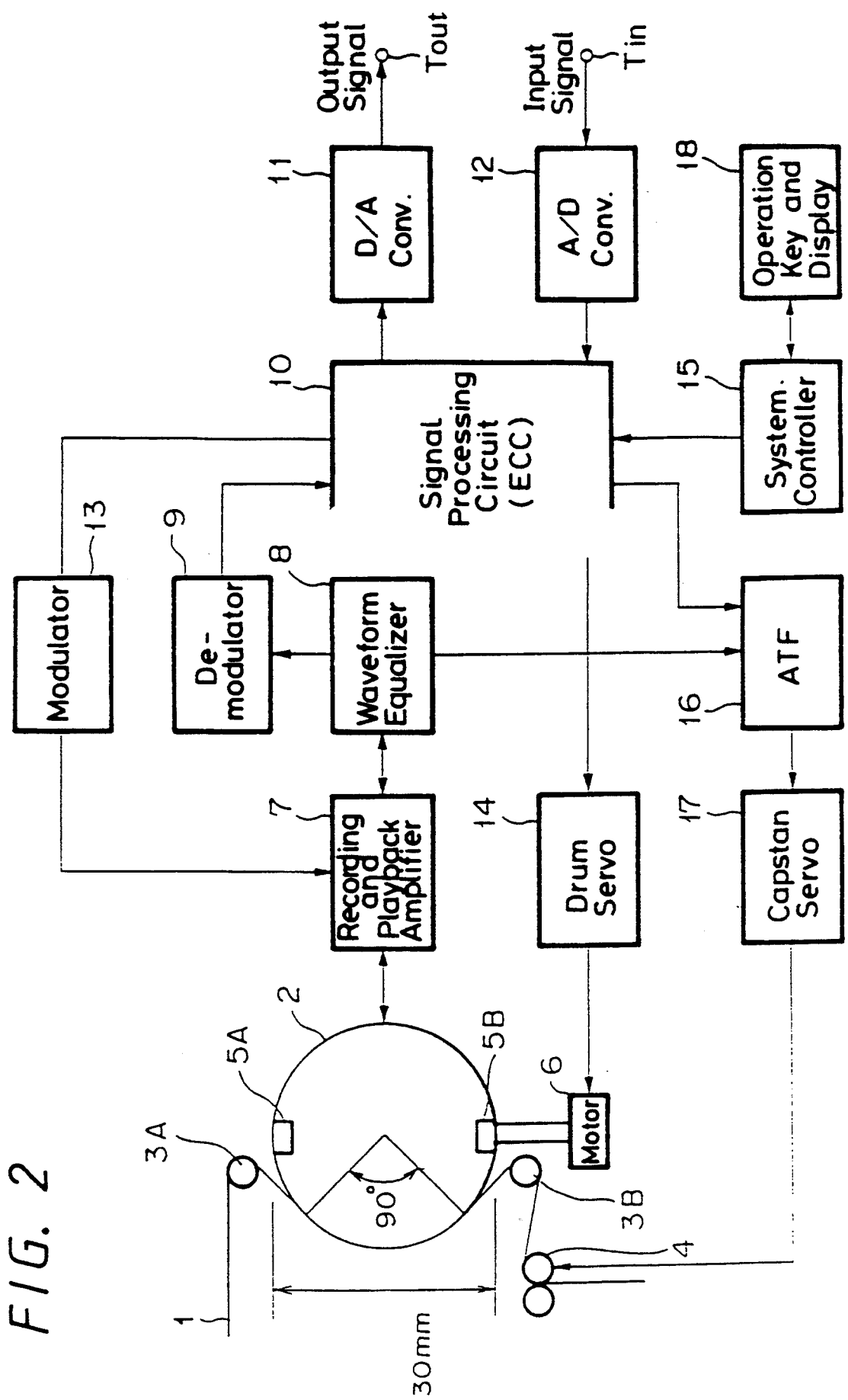
FIG 2 is a block diagram of a demodulator for use in a maximum likelihood decoding apparatus according to the present invention.

Referring to FIG. 2, there will hereinafter be explained about a whole construction upon the case when a maximum likelihood decoding apparatus according to the present invention and a reproduced data demodulating apparatus employing this maximum likelihood decoding apparatus are applied to a DAT.

In FIG. 2, a magnetic tape 1 is wound around a drum 2 of about 30 mmφ within a range of 90° through guide rollers 3A and 3B. Reference numeral 4 represents a capstan, which is driven by a capstan motor, not shown, or the like and allows the magnetic tape 1 to travel in a predetermined direction. Reference numerals 5A and 5B represent rotary heads provided on a periphery of the drum, and the drum 2 is rotated and driven by a motor 6. The motor of the capstan 4 and the motor 6 of the drum 2 are driven and controlled by a drum servo controlling circuit 14 and a capstan servo controlling circuit 17, respectively, to which control signals are supplied from a signal processing circuit {including an error correcting circuit (ECC)} 10 controlled by a system controller 15.

Reference numeral 16 represents an ATF (Automatic Track Finding) circuit, which is supplied with signals from a waveform equalizer 8 and the signal processing circuit 10 and supplies an ATF signal to the capstan servo controlling circuit or the like so that a tracking servo control is performed. The system controller 15 has operation keys and a displaying apparatus 18.

Upon recording, an analog input signal such as an audio signal, a video signal or the like from an input terminal TIN is converted to a digital data signal through an analog-to-digital converter 12 and then supplied to the signal processing circuit 10, which generates data to be recorded which accord with a system format.

The data obtained from the signal processing circuit 10 is supplied to a modulator 13, which supplies a symbol data through a recording amplifier of a recording and reproducing amplifier 7 to heads 5A and 5B and then recorded on the magnetic tape 1.

Figure 3:
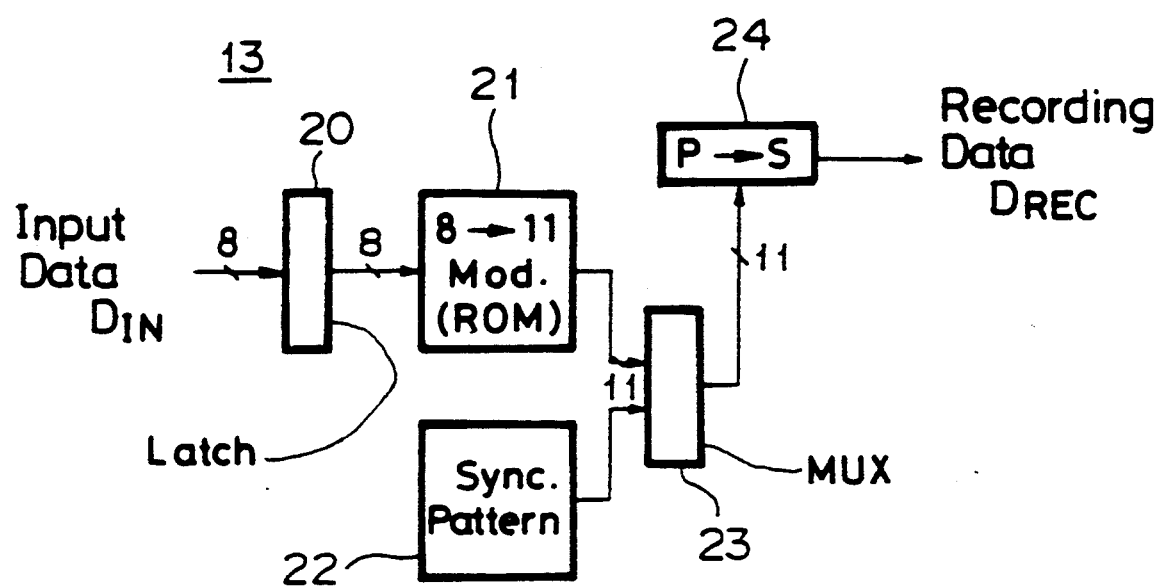
FIG. 3 is a block diagram of a modulator for use in a maximum likelihood decoding apparatus according to the present invention.

FIG. 3 shows a concrete construction of the above-mentioned modulator 13. In FIG. 3, an input data DIN of 8 bits, for example, from the signal processing circuit 10 are supplied through a latch circuit 20, and then an eight-to-eleven modulation formed of ROM tables, which will be described later, shown in Table 1 and Table 2 is performed. The modulated data, which is modulated to 11 bits, is supplied to a multiplexer 23.

A synchronizing signal from a synchronization pattern generating circuit 22 is supplied to the multiplexer 23 and added to the modulated data, and output as a data to be recorded DREC through a serial-to-parallel converting circuit (P-S) 24 and then recorded directly on the magnetic tape 1 through the recording amplifier of the recording and reproducing circuit 7.

Such signal having a differential waveform corresponding to the data thus recorded on the magnetic tape 1 is reproduced by the heads 5A and 5B amplified by the reproducing amplifier of the recording and reproducing amplifier 7, and then supplied to the wave-form equalizer 8 comprising an integrator and a low-pass filter. After an output of this equalizer 8 is decoded in a demodulator 9 and subjected to various signal processings in the signal processing circuit 10, it is converted to an analog signal by a digital-to-analog converter 11 and output therefrom to an output terminal TOUT as an output signal.

Figure 4:
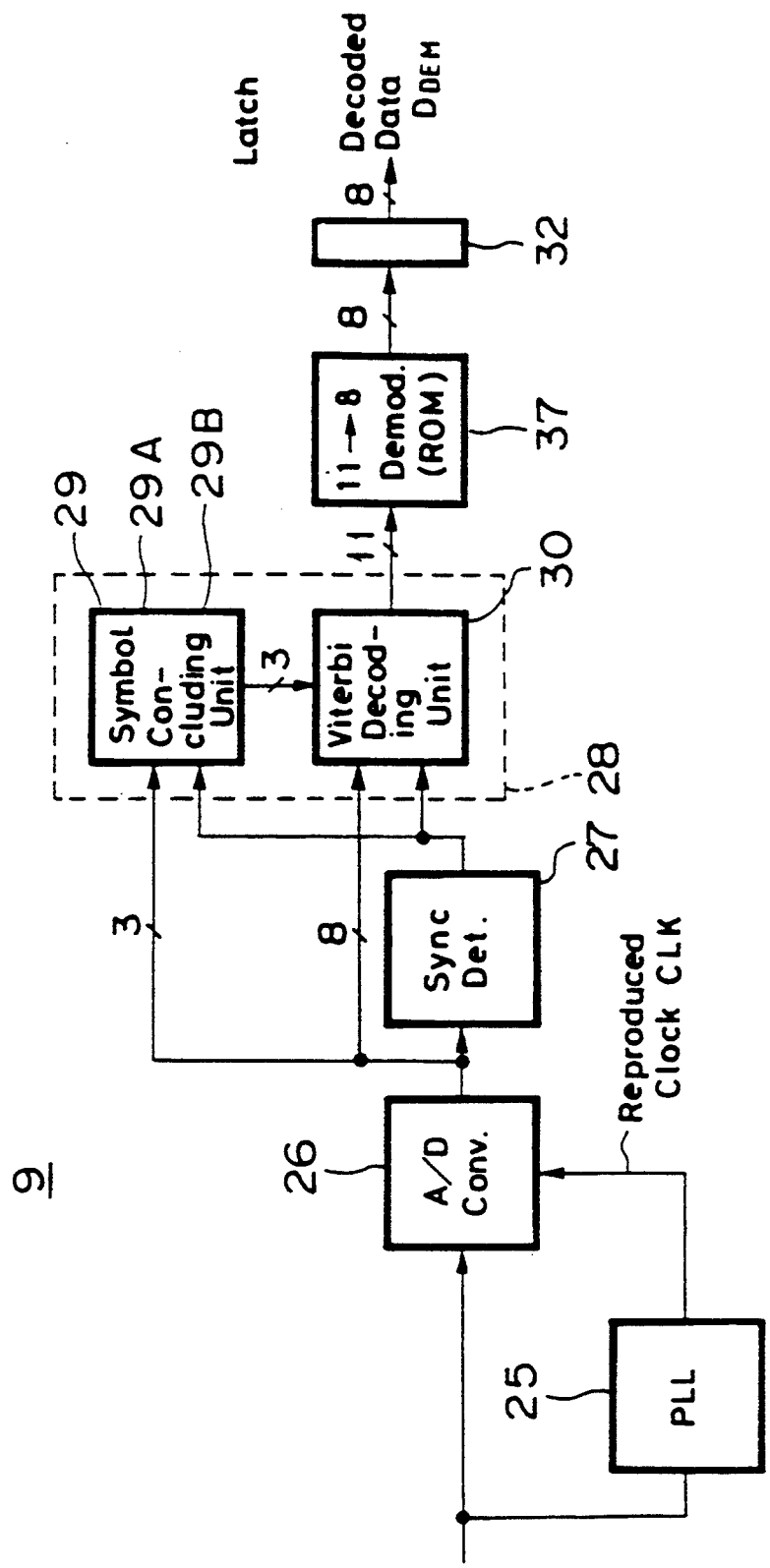
FIG. 4 is an overall block diagram showing the case that the maximum likelihood decoding apparatus according to the present invention is applied to a DAT (digital audio tape recorder)

A construction of the above demodulator is shown in FIG. 4. A reproduced data DPB from the wave-form equalizer 8 is supplied to an analog-to-digital converter 26 and also to a PLL circuit 25, and to the analog-to-digital converter 26 an output of the PLL circuit 25 is supplied as a reproduction clock CLK.

In a synchronization detecting circuit 27, a synchronizing signal in an output of the analog-to-digital converter 26 is detected and supplied to a symbol concluding unit 29 and a viterbi decoding unit 30 which compose a maximum likelihood decoder 28. At the same time, the data of 8 bits from the analog-to-digital converter 26 is supplied to the symbol concluding unit 29 and the viterbi decoding unit 30.

The symbol concluding unit 29 comprises a terminal pattern detecting unit 29A and a terminal code deciding unit 29B which will be described later. A terminal code decided in the terminal code deciding unit 29B is supplied to the viterbi decoding unit 30, and from the viterbi decoding unit 30 a data of 11 bits is supplied to an eleven-to-eight decoder composed of a ROM table, which decodes the data of 11 bits to a data of 8 bits which is supplied as a decoded data DDEM through a latch circuit 32 to the signal processing circuit 10.

Figure 5:
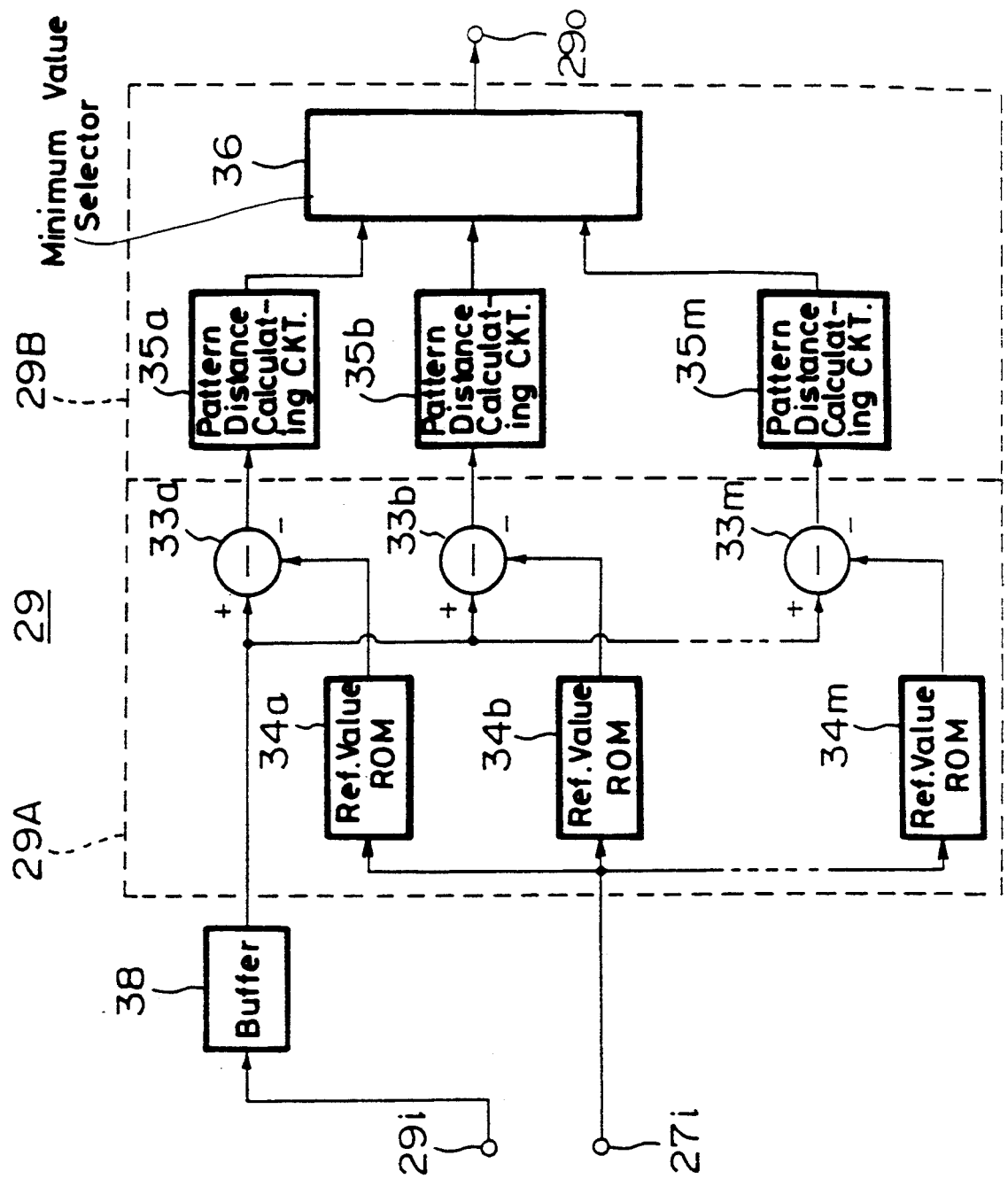
FIG. 5 is a block diagram of a symbol concluding unit for use in the maximum likelihood decoding apparatus according to the present invention.

One example of a construction of the above-mentioned symbol concluding unit 29 is shown in FIG. 5. In FIG. 5, an 3-bit data is supplied from an input terminal 29i of the symbol concluding unit 29 to a buffer 38, and the synchronizing signal from the synchronization detecting circuit 27 is supplied to a synchronizing-signal input terminal 27i.

The data is supplied through the buffer 38 uniformly to a plurality of subtracters 33a to 33m. Reference numerals 34a to 34m represent reference value ROMs, in which the wave-form values of code patterns selected as references are respectively stored. The output of the synchronization detecting circuit 27 is supplied uniformly to each of the ROMs 34a to 34m, and outputs of these ROMs 34a to 34m are respectively supplied to the subtracters 33a to 33m corresponding thereto.

Reference numerals 35a to 35m represent pattern distance computing circuits, and reference numeral 36 represents a minimum value selecting circuit. Outputs of the subtracters 33a to 33m are supplied to the computing circuits 35a to 35m, respectively, and an output of each of the computing circuits 35a to 35m is supplied to the minimum value selecting circuit 36, so that a pattern data having the shortest distance to a waveform value of each code pattern is derived as 3 bits at an output terminal 29o.

Figure 6A:
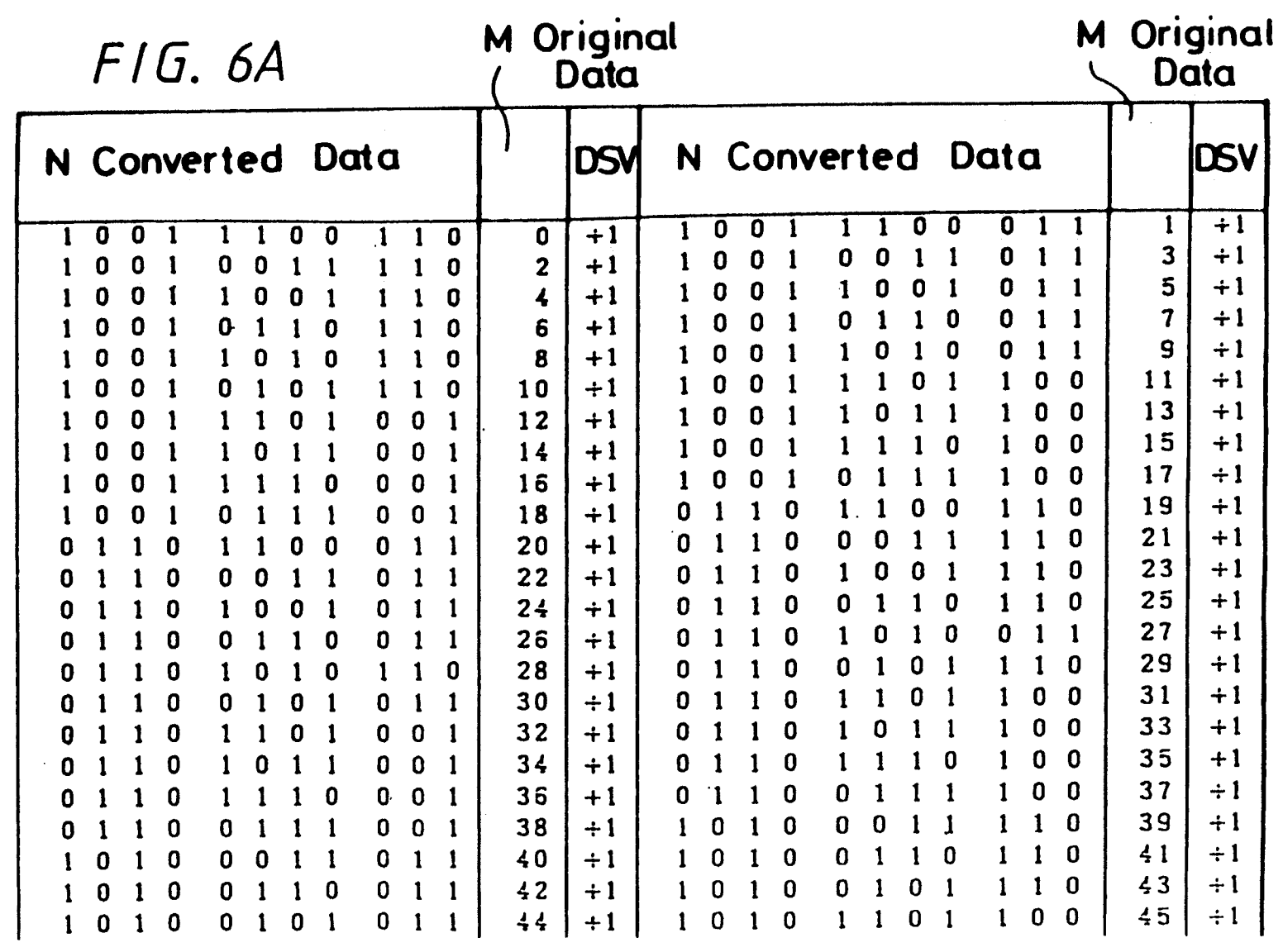
Figure 6C:
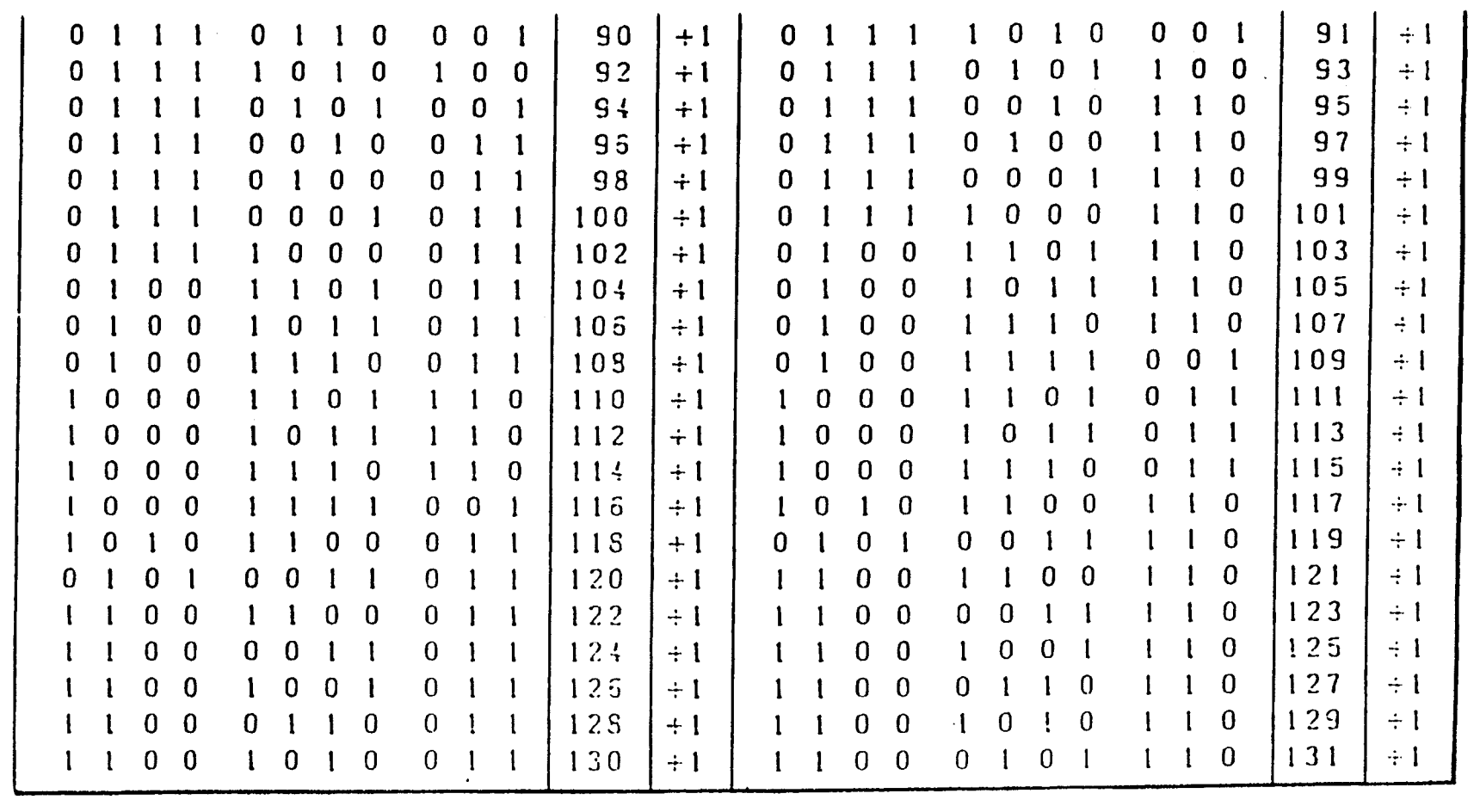
Figure 7B:
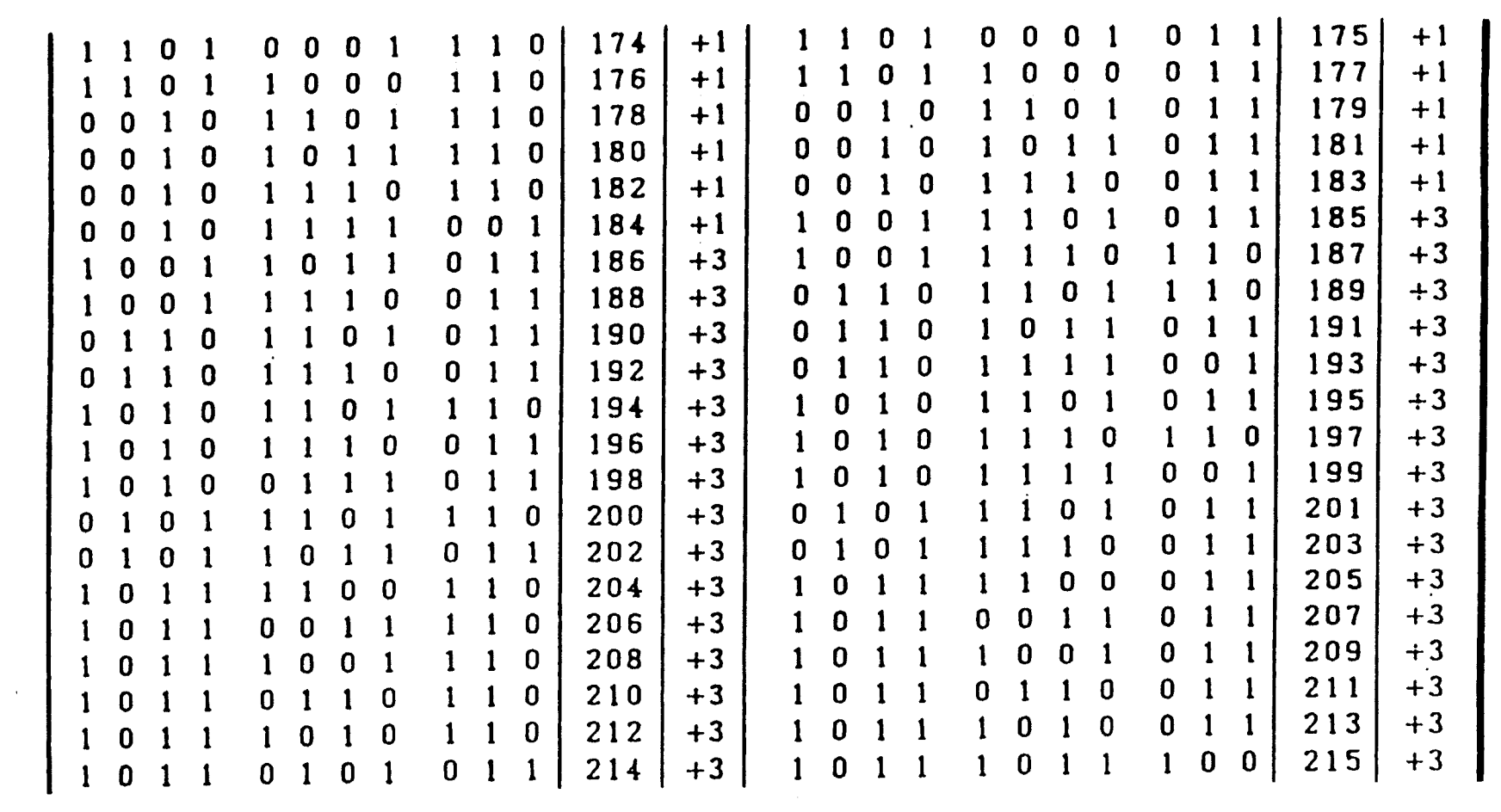

A modulator, which comprises ROM tables in the modulator 13 constructed as described above, performs an eight-to-eleven conversion to convert an original data of 8 bits (M bit) to a data of 11 bits (N bit > M bit) as shown in FIGS. 6 and 7.

In FIGS. 6 and 7, there are shown converted codes of 11 bits (N-bit > M bit) corresponding to codes of M bit from 0 to 255 (corresponding to 8 bits) and DSV (Digital Sum Variation). In FIGS. 6 and 7, the DSV has positive values.

Besides FIGS. 6, 7, there are such tables, not shown, corresponding to FIGS. 6 and 7 that 1 and 0 of N bit in Table 1 and Table 2 are inverted as 0 and 1, respectively, to thereby allow the DSV to have negative values. These values are also stored as the ROM tables in the eight-to-eleven modulator 21.

As to each parameter of the above-mentioned eight-to-eleven modulation codes, a ratio Tmax/Tmin of a maximum interval of magnetization reversal Tmax to a minimum interval of magnetization reversal Tmin, in which a sequence of 0 is restricted to four, is selected equal to or less than 4, and a recording surface (line) density is selected high. Further, a window width Tw is selected wide to thereby make it DC free. In the following Table 3, various parameters of the eight-to-eleven modulation system are shown.

TABLE 1

| | $T_{min}$ | $T_{max}$ | Tw | DC |
|---|---|---|---|---|
| 8–11 | 0.73 | 2.9 | 0.73 | FREE |

In the present embodiment, as to a transfer characteristic there is employed such Pr (1, 1) in which a frequency spectrum is compressed to ½ in comparison with a single current code. Needless to say, the transfer characteristic of class IV of a partial response system, whose number of a reception level is 3, may be selected. That is, in the present embodiment, Tmax is selected to be 4T, so that a recording band is set on a shorter wavelength side than a characteristic of the Pr (1, 1).

Figure 8:
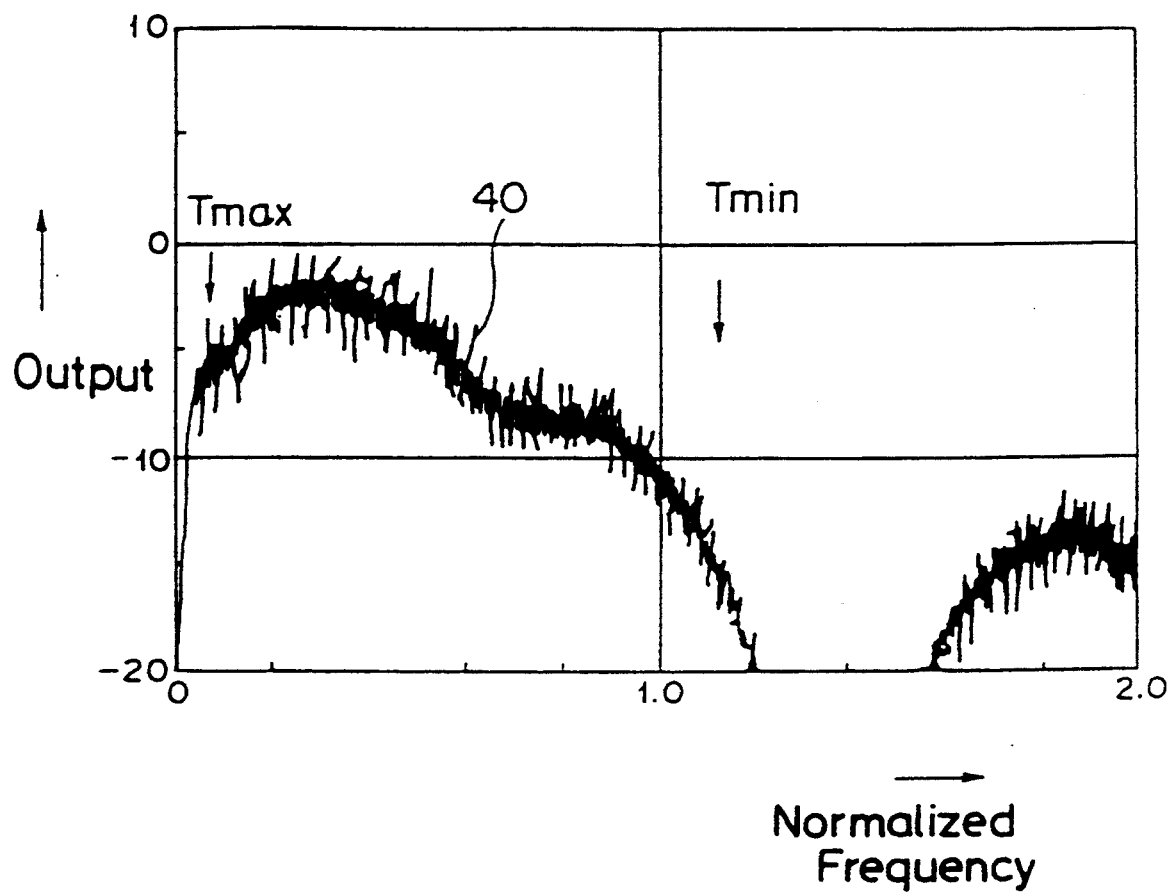
FIG. 8 is a frequency spectrum of a modulation code of the modulator for use in the present invention.

FIG. 8 shows a power spectrum distribution at a recording speed of 28 Mbps after modulation of a data of a random input series. The abscissa represents a standardized frequency standardized at the recording speed, and an output level of the ordinate is represented as a logarithmic value.

As will be clear from this figure, there is obtained a power spectrum curve 40 subjected to a band restriction biasing the recording band to the short wavelength side, whereby a recording band suitable for an azimuth recording can be obtained. Even if recording on the magnetic tape 1 is performed at a frequency, whose recording wavelength is ½ ($\lambda_{min}$=0.33 μm) of that of a normal DAT, by a recording head with its wide width (a recording head width Tw=14 μm), recording with a considerably narrow track pitch (TP=6.8 μm) is possible.

Figure 9:
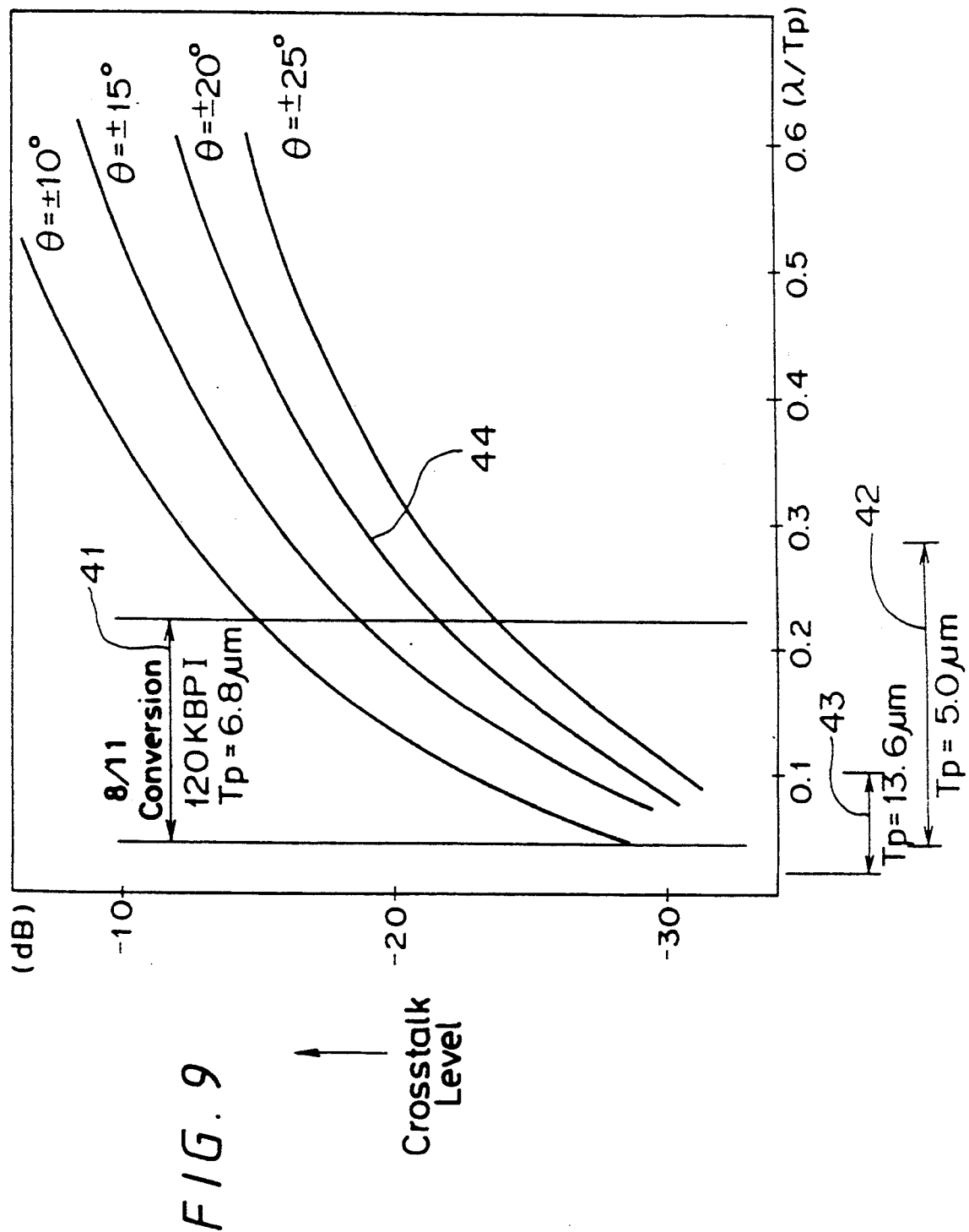
FIG. 9 is a characteristic diagram of a crosstalk level and an azimuth angle used to explain an effect of the modulator for use in the present invention.

FIG. 9 shows crosstalk characteristic curves showing the relation between a cross talk level (the ordinate) and the recording wavelength / the track pitch= ^ G ^ Gg/TP (the abscissa) in the case when an azimuth angle ^ G ^ Gr of the heads 5A and 5B is selected to be ±10°, ±15°, ±20° and ±25°.

Reference numerals 41, 42 and 43 represent lengths in case of TP=6.8 μm, 5.0 μm and 13.6 μm. From a curve 44, for example, of the crosstalk characteristic curves it can be understood that even when the azimuth angle θ is 20°, the crosstalk level falls within the range from −23 to −30 dB so that recording is possible even with the TP of 5 to 6.8 μm.

Needless to say, any overwrite noise is also reduced, and since Tw is selected large, a rotary head system or the like can be used and the system capable of detecting a large phase tolerance can be obtained.

Next, the maximum likelihood decoder 25 comprising the viterbi decoding unit 29 and the symbol coupling unit 29, which are constructed as explained in FIGS. 4 and 5, will be explained with reference to FIG. 5 and FIGS. 10 to 13.

Figure 10:
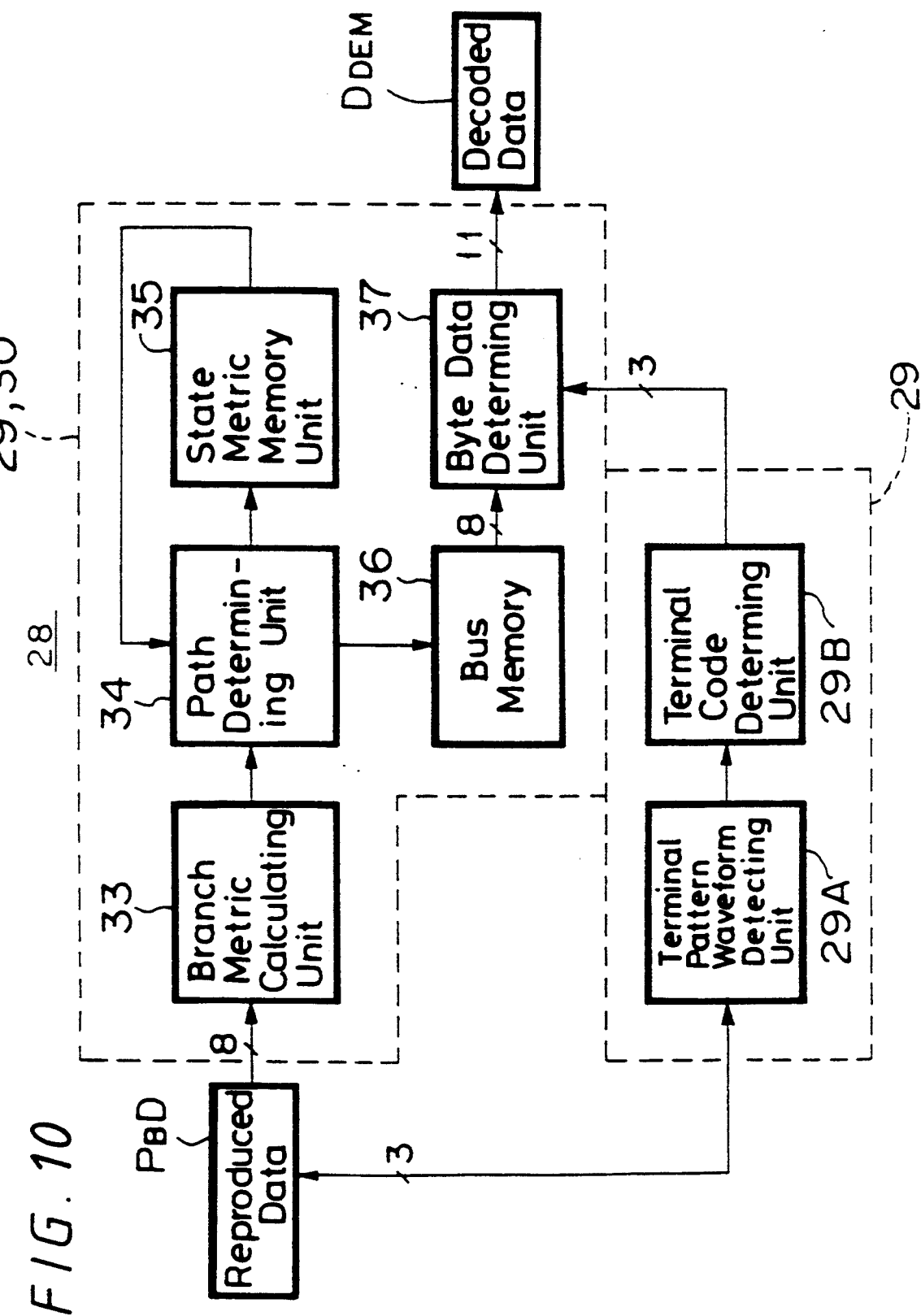
FIG. 10 is a block diagram showing a maximum likelihood decoding apparatus according to the present invention.

FIG. 10 shows a function block of the maximum likelihood decoder 28. The reproduced data, which is converted in the eight-to-eleven modulator to have an 11-bit ward, is divided into an 8-bit data and a 3-bit data. That is, as shown in FIG. 11A, the 11 bits are divided into the front 8 bits thereof shown in FIG. 11B and the rear 3 bits thereof shown in FIG. 11C. The 8-bit data is input into a branch metric computing unit 33, and the 3-bit data is input into the symbol concluding unit 29 of the viterbi decoding unit 30.

The symbol concluding unit 29 comprises the terminal pattern wave-form detecting unit 29A and the terminal code deciding unit 29B, which are constructed as explained in FIG. 5. That is, the terminal pattern waveform detecting unit 29A comprises the plurality of reference ROMs 34a, 34b, $\widetilde{NNNN}$ and 34m and the plurality of subtracters 33a to 33b to thereby identify the wave form.

Predetermined concluding codes are stored in the reference ROMS 34a to 34m. In the following Table 2, concluding signs corresponding to concluding codes are shown.

TABLE 2

| | concluding signals |
|---|---|
| 1 | 110 |
| 2 | 011 |
| 3 | 001 |
| 4 | 10 |

The terminal code deciding unit 29B comprises the plurality of pattern distance computing circuits 35a to 35m and the minimum value selecting circuit 36. In the pattern distance computing circuits 35a to 35m, there is computed a pattern distance between an input pattern and concluding sign patterns in the ROMs shown in Table 2.

In the minimum value selecting circuit 36, there is selected a single input pattern having a shortest distance Dmin from either of m pieces of the concluding code pattern outputs from the pattern distance computing circuit 35a to 35m, and then it is output as a data detected with maximum likelihood, namely, the most likely detected data to a byte data deciding unit. Next, a summary explanation about the viterbi decoding unit 30 will be made. As to the 8 bits of the reproduced data PBD, its metric is determined according to equation (1) in the branch metric computing unit 33.

$$L_{k+}=max[L_{k\text{-}1}{}^{+}+\{-(Y_k-2)_2\}, \\ L_{k\text{-}1}{}^{-}+\{-(Y_k-0)^2\}] \qquad (1)$$

$$L_{k^-}=max[L_{k\text{-}1}{}^{+}+\{-(Y_k-0)^2\}, \\ L_{k\text{-}1}{}^{-}+\}-(Y_k-2)^2\}] \qquad (2)$$

$$\Delta L_k=L_k{}^{+}-L_k{}^{-} \qquad (3)$$

In the above equations, Lk+ and Lk− represent the metrics corresponding to state numbers at time k, and yk represents a reproduction output.

The above equation (1) finds paths 50 and 51 in a trellis diagram shown in FIG. 12, and the equation (2) finds the metrics of paths 52 and 53 thereof. In the equation (3), since negative numbers are accumulated and then absolute values of their metrics become infinite in the equations (1) and (2), difference between these metrics is selected as a path determining information.

Figure 13:
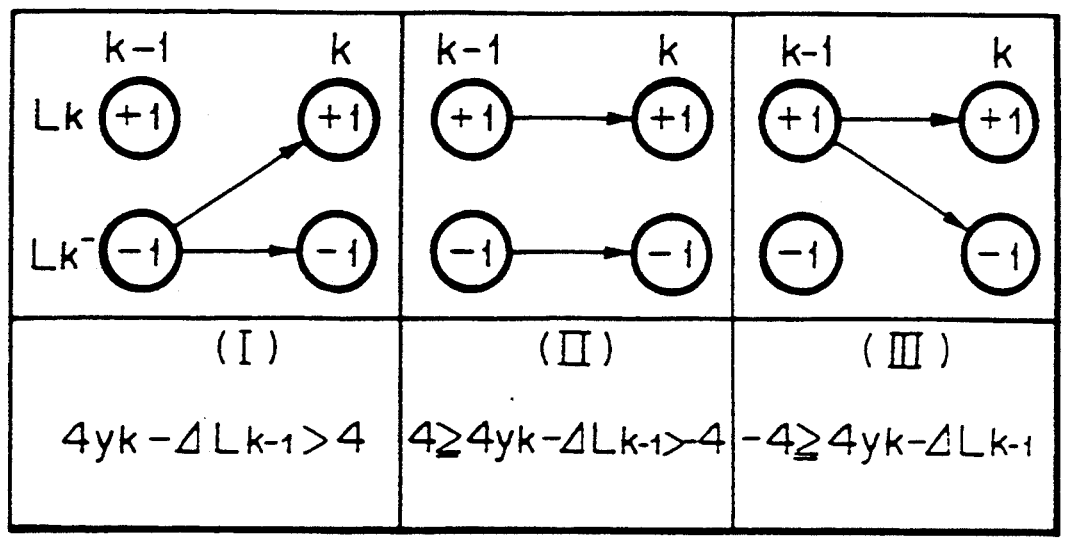
FIG. 13 is an explanatory diagram of a bus determination used to explain the viterbi decoding of the maximum likelihood decoding apparatus according to the present invention.

The equations (1) and (2) are substituted in the equation (3), and then ^ G ^ GWLk is computed. In a path determining circuit 34 at the next stage, as shown in FIG. 13, one path in accordance with three path states shown in I, II and III is determined and output to a state metric memory unit 35 at the next stage.

In the state metric memory unit 35, a stored metric GGWLK-1 before one state is returned to the bus or path determining circuit 34 to thereby supply a next difference metric ^ G ^ GWLK to a path memory 36.

In the path or bus memory 36, informations of "0", "1" and "indefinite" are stored from the path. In a byte data deciding unit 37, the "indefinite" data among the 8-bit data supplied from the bus memory 8 is determined as "1" or "0" by the terminal code deciding unit 29, and the terminal 3-bit $\char`\^$Gd$\char`\^$Ga$\char`\^$Gt$\char`\^$Ga$\char`\^$Gi$\char`\^$Gs added to the 8-bit data so that the data becomes the data of 11 bits and are output as a decoded data $D_{DEM}$.

The 11-bit data thus viterbi-decoded is converted to the 8-bit data in the decoder 37 for the eleven-to-eight conversion. This eleven-to-eight conversion is an inverse conversion of the eight-to-eleven conversion shown in FIGS. 6 and 7, and it is stored in ROMs or the like.

Figure 14:
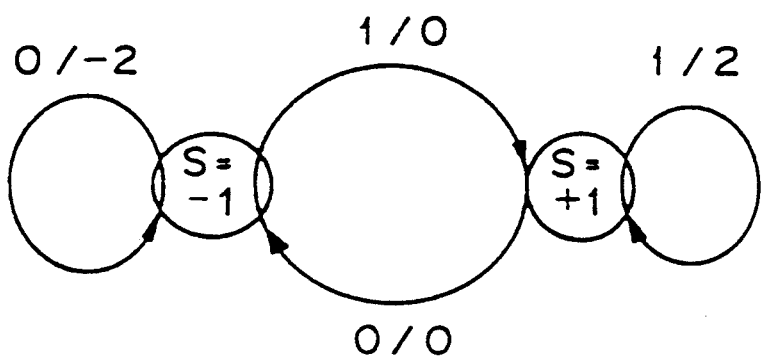
FIG. 14 is a state transition diagram of the maximum likelihood decoding apparatus according to the present invention.
Figures 15A, 15B:
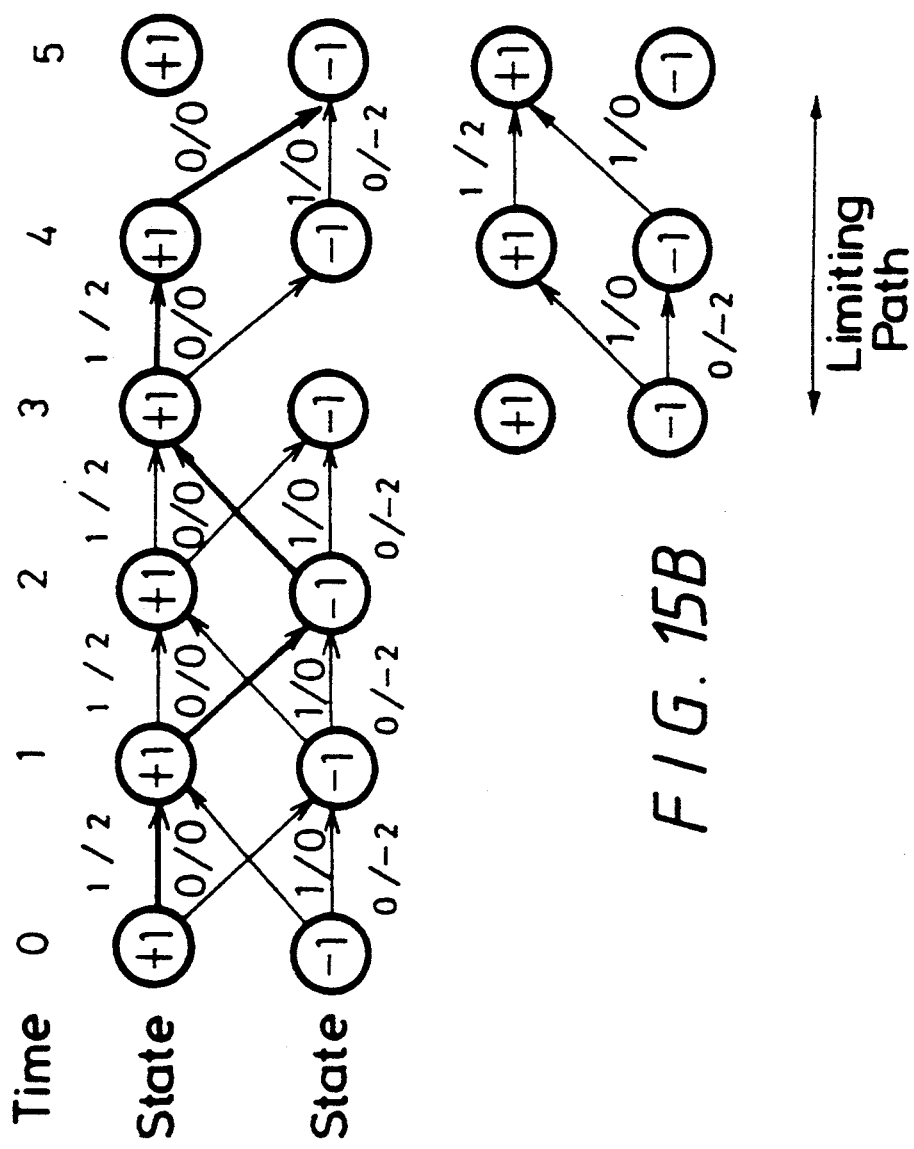
FIGS. 15A and 15B are respectively trellis line diagrams of the maximum likelihood decoding apparatus according to the present invention.

A state transition diagram showing the above-mentioned state transition is shown in FIG. 14, and a trellis line diagram representing the state transition by time sequence is shown in FIGS. 15A and 15B.

FIG. 14 shows the case of the transfer characteristic or the Pr (1, 1). In the transition diagram, $S = -1$ means the case where if "0" is input, then "$-2$" is output and if "1" is input, then "0" is output. $S = +1$ means the case where if "0" is input, then "0" is output and if "1" is input, then "2" is output. 0/2, 1/0, 0/0, 1/2 and so on represent relations of input/output.

As shown in FIGS. 15A and 15B which are trellis line diagrams, a viterbi-decoded remainder path is restricted in the symbol concluding unit. That is, decoding at times 3, 4 and 5 is determined by the terminal code deciding unit 29B of FIG. 10 to thereby perform a path restriction, so that the code is concluded with the total 11 bits of the 8 bits from the Viterbi decoding and the 3 bits from the concluding unit, whereby there can be obtained the viterbi decoding apparatus in which the code is concluded in a predetermined unit bit. That is, the symbol concluding unit and the viterbi decoding unit are constructed in parallel as shown in FIG. 4 and FIG. 10, so that there is realized the parallel maximum likelihood decoding apparatus which operates at high speed and in which a hardware is simplified.

Figures 16A, 16B, 16C:
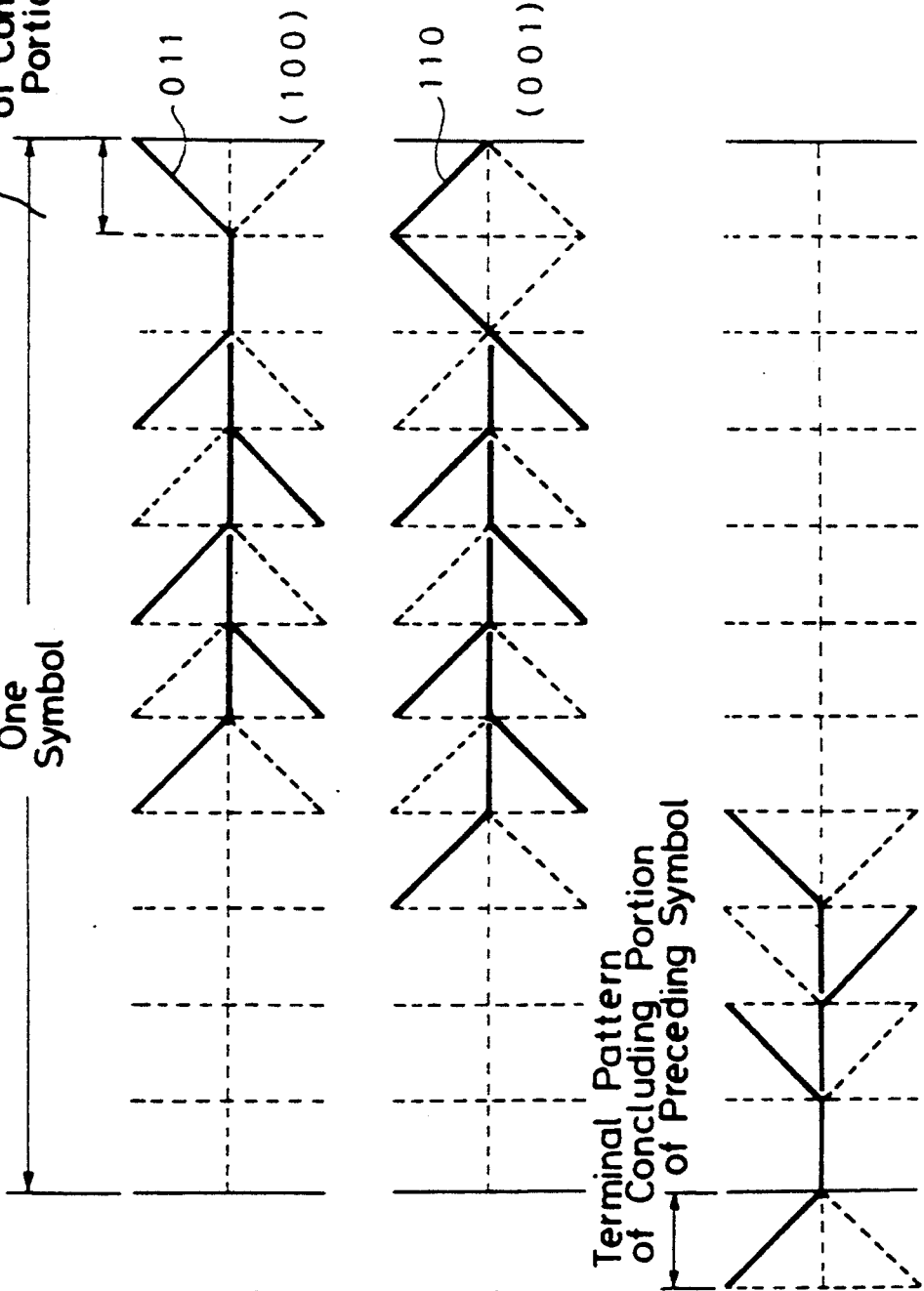
FIGS. 16A through 16C are respectively trellis line diagrams in a 1 symbol unit of the maximum likelihood decoding apparatus according to the present invention.

FIGS. 16A and 16B show trellis diagrams in 1 symbol (11 bits) unit. FIG. 16C shows a joint state with the previous symbol. When the terminal pattern of the concluding unit is detected, the certain data-decoding is determined uniquely and the remaining path of the viterbi decoding disappears, with the result that a smooth joint with the next symbol can be performed. Further, if wave-form equalizing for preservation of 0 level is performed, then since the concluding code has a Gn output mutual difference of 2V at 2 point detection, improvement of a S/N ratio by 3 dB can be obtained by the viterbi decoding in the case where a three value level detection is performed with noise distribution of Gaussian distribution.

According to a conventional maximum likelihood decoding apparatus, a detection error is caused by a lack of high band or the like, while in the maximum likelihood decoding state according to the present embodiment, there is an effect to control this error. This is shown in FIG. 17.

Figure 17:
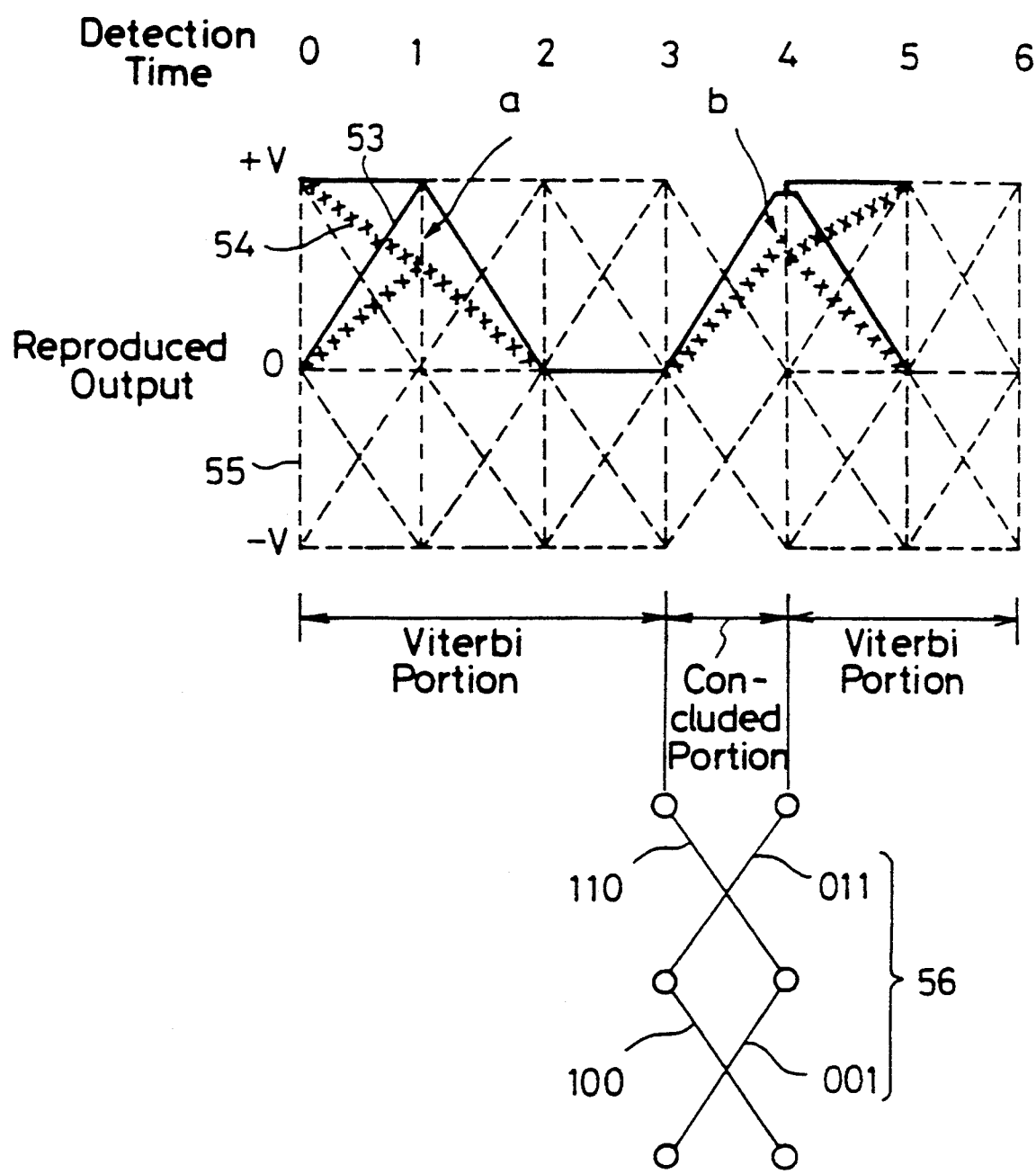
FIG. 17 is an explanatory diagram of an error suppression pattern of the maximum likelihood decoding apparatus according to the present invention.

In FIG. 17, correct waveforms (corresponding to a thick line in FIG. 15A) at the detection times 1, 2, 3 and 4 are shown by a waveform 53 shown by a thick line. A waveform 54 shown by a thick and broken line represents a practical reproduced wave form, which has a distortion quantity of a at the time 1 and of b at the time 4.

Portions at the times 0, 1, 2 and 3 represent the first half of the viterbi decoding portion. A portion between the times 3 and 4 represents the concluding portion. Portions at the times 4, 5 and 6 represent the second half of the Viterbi decoding portion. A trellis 55 shown by a thin broken line represents a recording code, showing a permissible course of the reproduced waveforms.

While a condition that an error is caused in the conventional Viterbi decoding with the above-mentioned construction is an error quantity $a + b > V$, but in the present embodiment it is an error quantity $b > V$.

As to an error occurrence condition, as shown in a reproduced waveform 56 of the concluding portion, 110 and 001 as well as 100 and 011 tend to be mistaken. However, 110 and 001 have 0 and 1 at their ends, respectively, and in the similar way 100 and 011 have 0 and 1 at their ends, respectively. Therefore, an error quantity a of the viterbi portion at the former step is prevented from being propagated to the latter viterbi portion and it can be reliably stopped at the concluding portion.

That is, the error quantity has a tolerance a, and the reproduced waveform is restricted at the detection times 3 and 4 to thereby enable decoding without being subjected to any influence of a waveform distortion at the time 1. That is, when there is included a particular waveform distortion such as a transmission line having a characteristic such as the Pr (1, 1), the state transition is restricted to thereby enable the error rate to be improved.

Figure 18:
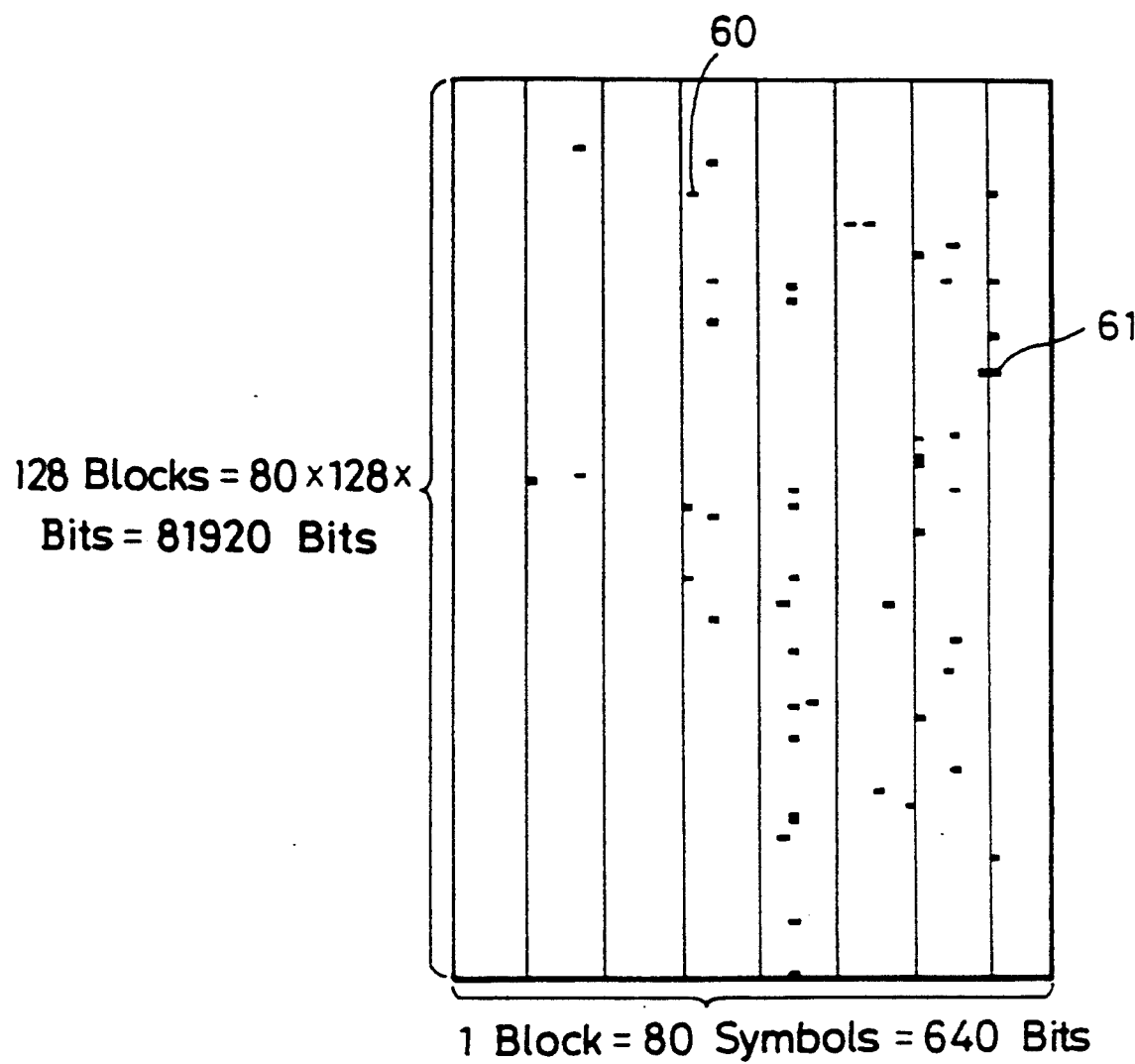
FIG. 18 is a measured state diagram of an error rate according to the present invention.
Figure 19:
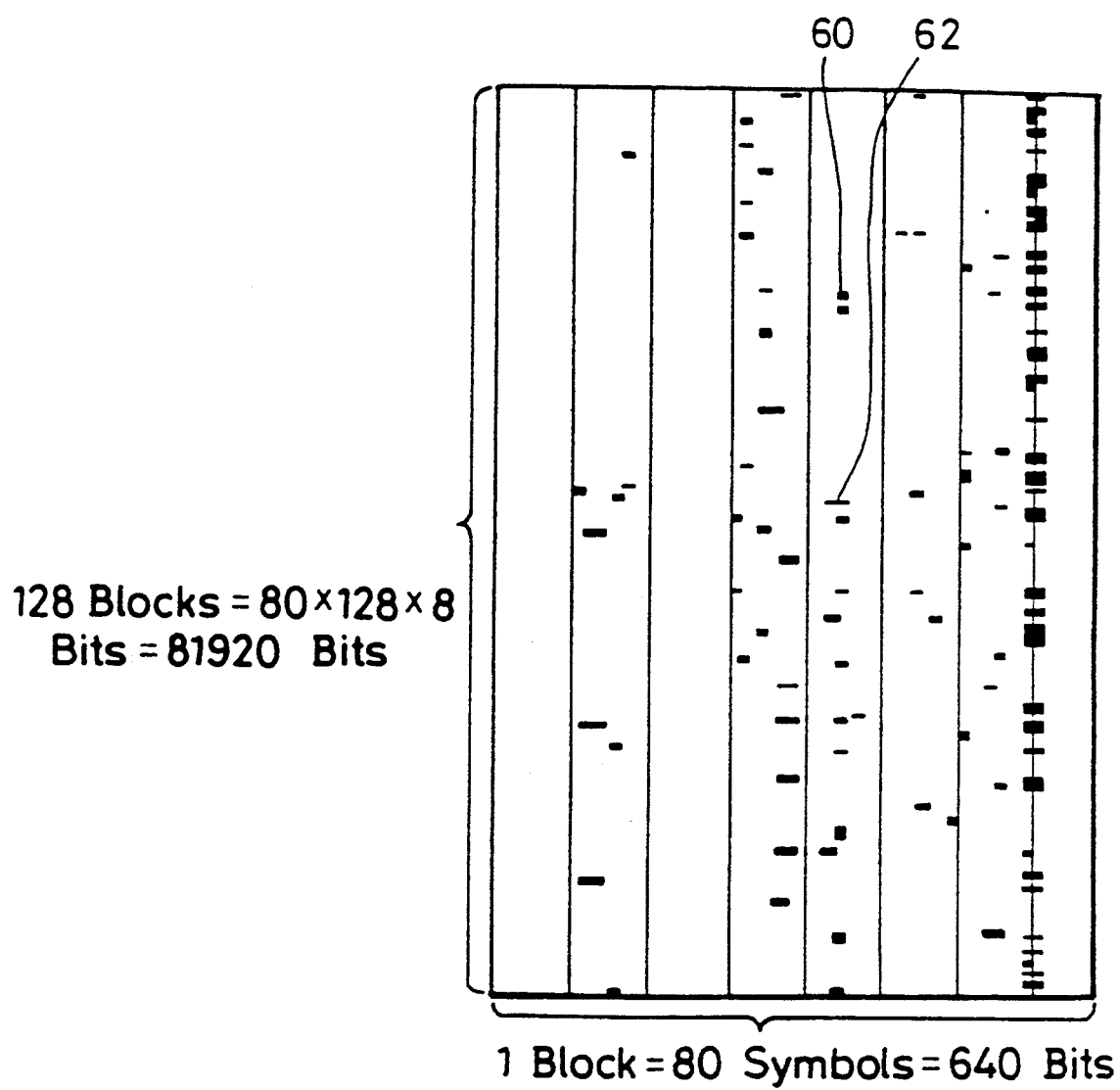
FIG. 19 is a measured state diagram of an error rate according to the prior art.

FIGS. 18 and 18 show real data showing practical error-suppression functions. FIG. 19 shows an error state in the viterbi decoding upon the case when a conventional concluding code is not operated, and FIG. 18 shows the error state in the case when the concluding unit according to the present invention is operated. In both figures, 1 block (=80 symbols) is represented on the abscissa while 128 blocks (80×128×8 bits=81920 bits) are represented on the ordinate. Reference numeral 60 represents a symbol error of one bit, and reference numeral 62 represents that of 2 bits.

As clearly shown in both state diagrams, there can properly be detected even the waveform having insufficient rise characteristic. A symbol error rate is considerably improved from 0.0167 to 0.046, and it is a quarter of that upon the viterbi decoding. In Table 3 there are shown main parts of a specification of a DAT to which such maximum likelihood decoding apparatus is applied. In the present embodiment, the rate of drum rotation and the number of recording and reproducing heads were increased twice to thereby realize an about nine times increased transfer speed (22.2 Kbps). A recording surface density is about 3.7 times increased (419 Mbpi$^2$). An R.F. course was changed to one at higher band and a tape transfer speed was also changed. A track pitch was selected to be 3.6 μm in a metal tape and 6.8 μm in an evaporation tape for Hi8.

TABLE 3

| item | specification |
| --- | --- |
| line recording density (Kbpi) | 112 |
| surface recording density (Mbpi) | 419(TP5.84μm) |
| tranfer speed (Mbps) | 22.2 |
| transmission line characteridtic | Pr (1, 1) |
| modulation system | 8/11 conversion |
| decoding system | fixed length most likelihood decoding |
| correction system | tripled RS code |
| input video signal | digital S.N.G |

TABLE 3-continued

| item | specification |
| --- | --- |
| drum specification | 4000 rpm, 30φ, 90 lap |
| relative speed | 6.8 m/s |
| magnetic tape | ME TAPE (for Hi8) |
| cassette | DAT cassette |

According to the present invention, construction as described above enables a modulating and demodulating apparatus, which operates at high speed and has large capacity, to be obtained. Therefore, recording can be performed with approximately double line density in a DAT. As to a decoding apparatus, the viterbi decoding is concluded to thereby stop an error propagation. Therefore, there are many effects that a parallel decoding can provide a high speed operation and so on. It is to be understood that the above described embodiment of the invention is illustrative only and that modifications thereof may occur to those skilled in the art.

Accordingly, this invention is not to be regarded as limited to the embodiment disclosed herein, but is to be limited only as defined by the appended claims.

What is claimed is:

1. A recording data modulating apparatus in which M-bit original data is converted into an N-bit recording code, where N is greater than M, said apparatus comprising:
   a modulation table in which there is stored an M-N modulation code in which a number of consecutive "0's" is less than 4 and in which a ratio between a maximum magnetic state transition time interval Tmax and a minimum magnetic state transition time interval Tmin of the stored M-N modulation code is less than 4;
   synchronizing pattern generating means for generating a synchronizing signal; and
   multiplexing means receiving said synchronizing signal and a modulation code signal read from said modulation table for multiplexing said synchronizing signal and said modulation code signal to form a recording data signal.

2. The recording data modulating apparatus according to claim 1, wherein said M-N modulation code is an 8-11 modulation code and Tmax/T=2.9 and Tmin/T=0.73 when T is a reference clock of said original data.

3. A reproduced data demodulating apparatus in which a synchronization of digital reproduced data is detected and said reproduced data is demodulated to obtain decoding data, said apparatus comprising:
   detecting means for assigning a final N-M bit in conversion data in which original data of an M-bit unit is converted into data of an N (>M)-bit unit as a terminal portion and detecting a code having a pattern that corresponds to data of a reproduced waveform of said terminal portion;
   determining means for determining a code having a pattern detected by said detecting means and outputting said code;
   decoding means for decoding said reproduced data by using the code output from said determining means; and
   demodulating means for demodulating an N-bit code decoded by said decoding means into M-bit data.

4. The reproduced data demodulating apparatus according to claim 3 wherein said decoding means decodes said reproduced data on the basis of a maximum likelihood Viterbi algorithm.

5. The reproduced data demodulating apparatus according to claim 4 wherein said detecting means comprises:
   reference value memory means in which there is stored a waveform value of a pattern selected as a reference from reproduced waveform patterns of said terminal portion and subtracting means for obtaining a difference between a waveform value of said reproduced waveform pattern and said reproduced data of said terminal portion; and
   said determining means comprises;
   distance calculating means for calculating a distance between said reproduced waveform pattern and said reproduced data on the basis of an output from said subtracting means and minimum value selecting means for selecting and outputting pattern data in which a calculated distance is shortest.

6. A recording data modulating apparatus in which 8-bit original data is converted into an 11-bit recording code, said apparatus comprising:
   a modulation table in which Tmax/T=2.0 and Tmin/T=0.73 when Tmax assumes a maximum magnetic transition interval, Tmin assumes a minimum magnetic transition interval and T is a reference clock of said original data, wherein said modulation table is addressed by the 8-bit original data and an 11-bit modulation code signal is read out therefrom;
   synchronizing pattern generating means for generating a synchronizing signal; and
   multiplexing means receiving said synchronizing signal and a modulation code signal read out from said modulation table for multiplexing said synchronizing signal and said modulation code signal to form a recording data signal.

7. A reproduced data demodulating apparatus in which a synchronization of digital reproduced data is detected and said reproduced data is demodulated to obtain decoded data, said apparatus comprising:
   analog to digital converting means for converting the reproduced data into an 11-bit digital signal;
   reference value memory means in which there are stored 3-bit waveform values of code patterns selected as references;
   subtracting means for obtaining differences between said waveform values of code patterns stored as references and final three bits of converted reproduced data from said analog to digital converting means;
   pattern distance calculating means for calculating a distance between said differences output from said subtracting means and a respective waveform value of each code pattern;
   minimum value selecting means for selecting a minimum calculated distance from said pattern distance calculating means;
   decoding means for decoding said reproduced data on the basis of a maximum likelihood Viterbi algorithm into an 11-bit code; and
   demodulating means for demodulating said 11-bit code decoded by said decoding means into 8-bit data.

* * * * *